United States Patent
Siegler

(10) Patent No.: US 10,158,199 B2
(45) Date of Patent: Dec. 18, 2018

(54) POWER CORD WITH IN-LINE POWER CONTROL FUNCTIONALITY

(71) Applicant: Microsoft Technology Licensing, LLC, Redmond, WA (US)

(72) Inventor: John J. Siegler, Carnation, WA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 275 days.

(21) Appl. No.: 14/952,223

(22) Filed: Nov. 25, 2015

(65) Prior Publication Data
US 2017/0149180 A1    May 25, 2017

(51) Int. Cl.
| | | |
|---|---|---|
| H01B 7/30 | (2006.01) | |
| H01R 13/70 | (2006.01) | |
| H01R 27/02 | (2006.01) | |
| H01R 13/66 | (2006.01) | |
| H01H 89/00 | (2006.01) | |
| H02J 13/00 | (2006.01) | |
| H05B 37/02 | (2006.01) | |
| H01R 13/703 | (2006.01) | |

(52) U.S. Cl.
CPC .......... *H01R 13/70* (2013.01); *H01H 89/00* (2013.01); *H01R 13/6683* (2013.01); *H01R 27/02* (2013.01); *H02J 13/00* (2013.01); *H05B 37/0263* (2013.01); *H01R 13/7038* (2013.01)

(58) Field of Classification Search
CPC ..... H01R 13/70; H01R 27/02; H01R 13/6683
See application file for complete search history.

(56) References Cited

U.S. PATENT DOCUMENTS

| | | |
|---|---|---|
| 5,541,457 A | 7/1996 | Morrow |
| 5,731,942 A | 3/1998 | Raviele |

(Continued)

FOREIGN PATENT DOCUMENTS

WO   2009135250 A1   11/2009

OTHER PUBLICATIONS

Hamblen, Jim, "Powerswitch Tail II", Published on: Apr. 11, 2015, Available at: https://developer.mbed.org/users/4180_1/notebook/powerswitch-tail-ii/, 3 pages.

(Continued)

*Primary Examiner* — Jared Fureman
*Assistant Examiner* — Duc M Pham
(74) *Attorney, Agent, or Firm* — Fiala & Weaver P.L.L.C.

(57) ABSTRACT

A power cord is described that includes "in-line" power control functionality. The power control functionality may selectively enable or disable a flow of electrical current through the power cord and/or selectively control an amount of electrical current that is permitted to flow through the power cord. The power control functionality may be activated and/or controlled through the receipt of control signals from an external device. The power cord may be configured to monitor the state of an electronic device to which it is connected and selectively activate and/or modify the operation of the power control functionality in response to the detection of a particular state of the electronic device. The power cord may also be configured to receive and analyze sensor data, and based at least on the analysis, selectively activate and/or modify the operation of the power control functionality.

20 Claims, 13 Drawing Sheets

(56) References Cited

U.S. PATENT DOCUMENTS

| | | | |
|---|---|---|---|
| 6,360,277 B1 | 3/2002 | Ruckley et al. | |
| 6,586,849 B2 | 7/2003 | Tarr | |
| 6,703,786 B2* | 3/2004 | Tannenbaum | H05B 37/0209 |
| | | | 315/149 |
| 6,933,686 B1 | 8/2005 | Bishel | |
| 8,093,751 B1* | 1/2012 | Puschnigg | H01R 13/665 |
| | | | 307/116 |
| 8,153,916 B2 | 4/2012 | Lindsey et al. | |
| 2005/0063116 A1 | 3/2005 | Rotheroe | |
| 2008/0062003 A1 | 3/2008 | Paetz | |
| 2010/0270982 A1 | 10/2010 | Hausman, Jr. et al. | |
| 2012/0139348 A1* | 6/2012 | DuBose | G06F 1/263 |
| | | | 307/80 |
| 2014/0240888 A1 | 8/2014 | Song et al. | |
| 2017/0149181 A1* | 5/2017 | Nelson | H01R 13/73 |

OTHER PUBLICATIONS

"Using Relays with Arduino—Turning on the Lights", Published on: Apr. 7, 2008, Available at: htlp://www.glacialwanderer.com/hobbyrobotics/?p=9, 5 pages.

* cited by examiner

POWER CORD WITH IN-LINE POWER CONTROL FUNCTIONALITY

BACKGROUND

There are a variety of scenarios in which it is desirable to control the manner in which power is provided to an electronic device. For example, in a data center, it may become necessary to shut off and then restore power to a network switch or other data center device when such device locks up, in order to reset it. Given the relatively large size of many conventional data centers, it is typically not feasible to require data center personnel to manually reset data center devices (e.g., by pressing a reset button on the device).

As another example, in an enterprise scenario, it may become necessary to shut off and then restore power to certain malfunctioning office equipment, such as routers, computers, and printers, in order to reset the equipment. The equipment to be reset may not be easily accessible, making a manual reset difficult or even impossible. For example, the equipment may be located relatively far away from the user seeking to reset the equipment or in an area of the office to which the user does not have access. As another example, it may be late at night or on a weekend, and no personnel may be present on site to manually reset the equipment.

In a home scenario, it may become necessary to shut off and then restore power to certain malfunctioning devices, such as set-top boxes, routers, and computers, in order to reset those devices. If the equipment is located in a different part of the home than the user, manually resetting the devices may be inconvenient for the user. If the user is away from home, then there may be nobody available to reset the devices.

In still other scenarios, it may become necessary to shut off and/or restore power to equipment or devices that are located in an environment that is uncomfortable or dangerous for a person to enter.

SUMMARY

A power cord is described herein that includes integrated or "in-line" power control functionality. In an embodiment, such power control functionality may be utilized to selectively enable or disable the flow of electrical current through the power cord. In a further embodiment, such power control functionality may also be used to selectively control an amount of electrical current that is permitted to flow through the power cord. Still other types of power control functionality may be included within the power cord.

The power control functionality may be activated and/or controlled through the receipt of control signals from an external device. Such control signals may be received by the power cord via an integrated wired interface, via an integrated wireless interface, and/or via one or more power-conducting wires of the power cord.

In an embodiment, the power cord includes control logic that is configured to monitor the state of an electronic device to which the power cord is connected and to selectively activate and/or modify the operation of the power control functionality of the power cord in response to the detection of a particular state of the electronic device.

In a further embodiment, the power cord includes control logic that is capable of receiving data from one or more sensors included within or otherwise connected to the power cord. The control logic is further configured to analyze the sensor data and based at least on the analysis, selectively activate and/or modify the operation of the power control functionality of the power cord.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Moreover, it is noted that the claimed subject matter is not limited to the specific embodiments described in the Detailed Description and/or other sections of this document. Such embodiments are presented herein for illustrative purposes only. Additional embodiments will be apparent to persons skilled in the relevant art(s) based on the teachings contained herein.

BRIEF DESCRIPTION OF THE DRAWINGS/FIGURES

The accompanying drawings, which are incorporated herein and form part of the specification, illustrate embodiments of the application and, together with the description, further serve to explain the principles of the embodiments and to enable a person skilled in the relevant art(s) to make and use the embodiments.

Figure 10:
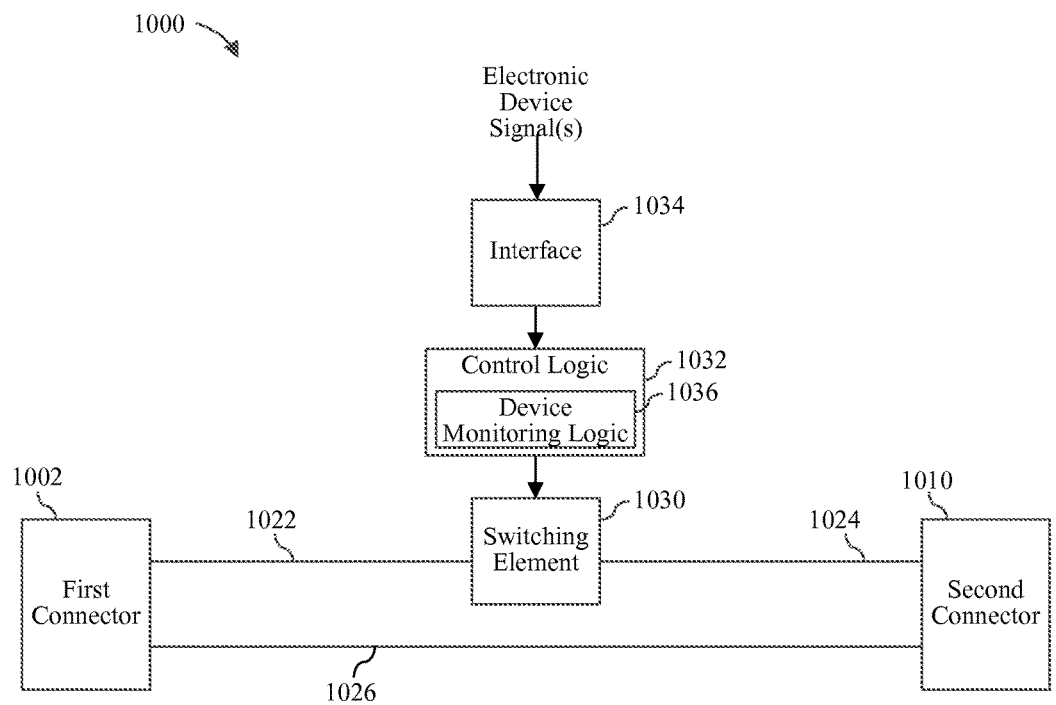

FIG. 10 is a block diagram of a power cord with in-line power control functionality in which control logic in the power cord is configured to activate and or modify the operation of the power control functionality based at least on the state of an electronic device to which the power cord is connected, wherein the state of the electronic device is determined based at least in part on signals received from the electronic device via one of an integrated wired or wireless interface.

Figure 11:
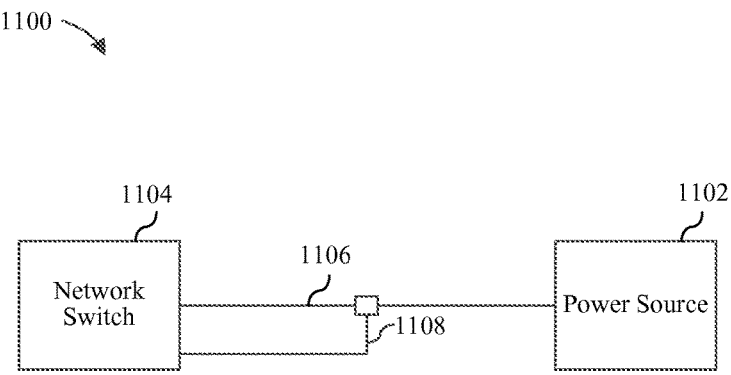

FIG. 11 is a block diagram of a system in which a power cord with in-line power control functionality activates and/or modifies the operation of the power control functionality based at least on the state of a network switch to which the power cord is connected, wherein the state of the network switch is determined based at least in part on signals received from the network switch via a wired or wireless communication link.

Figure 12:
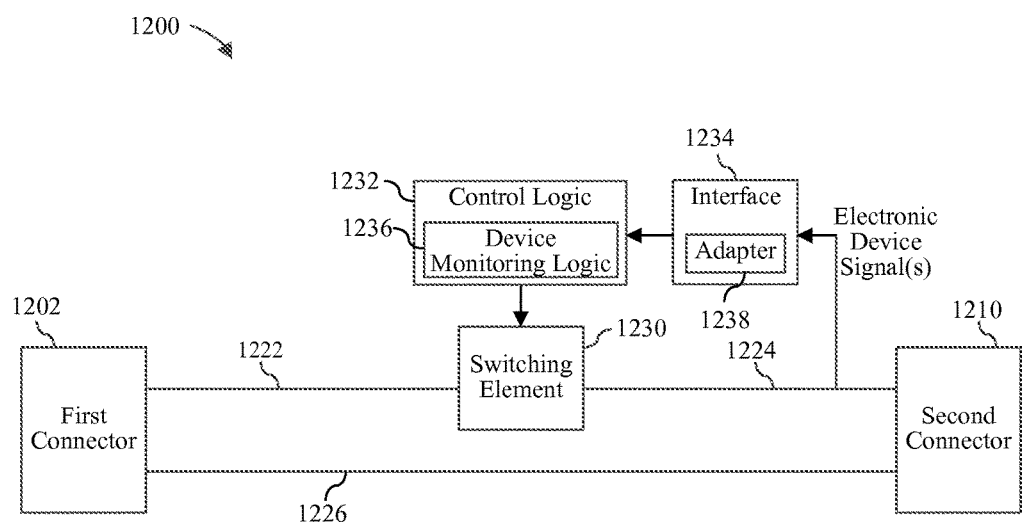

FIG. 12 is a block diagram of a power cord with in-line power control functionality in which control logic in the power cord is configured to activate and/or modify the operation of the power control functionality based at least on the state of an electronic device to which the power cord is attached, wherein the state of the electronic device is determined based at least in part on signals received from the electronic device via one or more conductive elements of the power cord.

Figure 13:
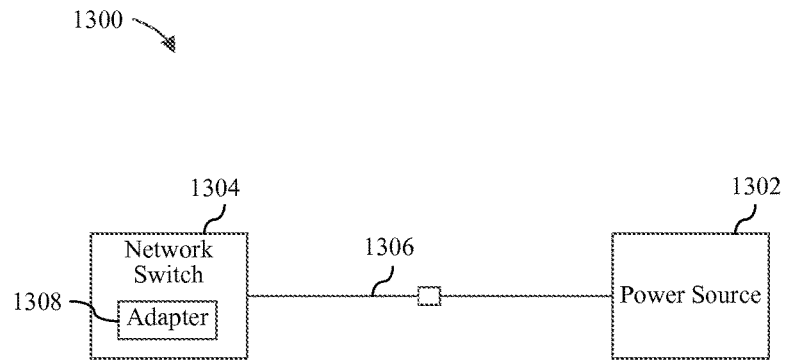

FIG. 13 is a block diagram of a system in which a power cord with in-line power control functionality activates and/or modifies the operation of the power control functionality based at least on the state of a network switch to which the power cord is connected, wherein the state of the network switch is determined based at least in part on signals received from the network switch via a conductive element of the power cord.

Figure 14:
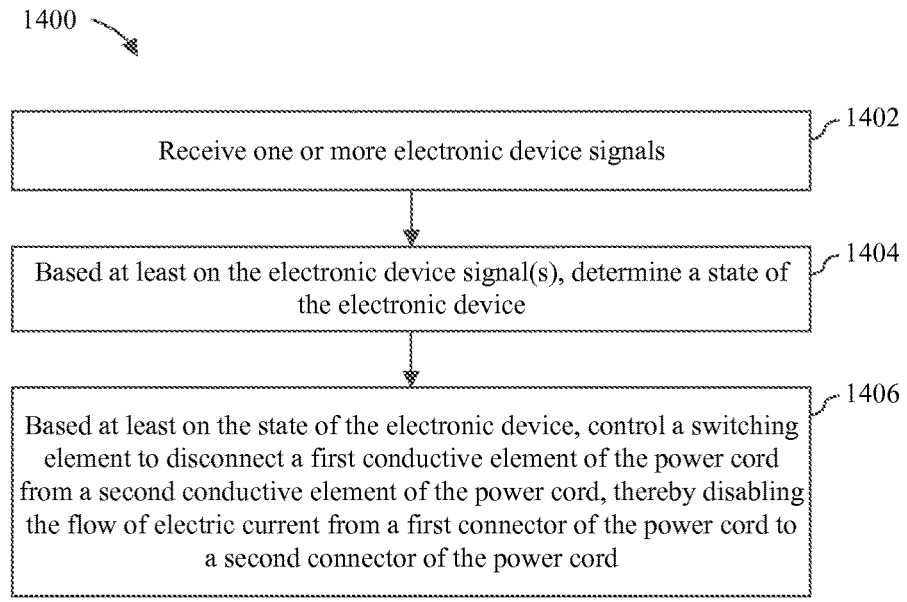

FIG. 14 depicts a flowchart of a method for disabling a flow of electric current through a power cord with in-line power control functionality based at least on a state of an electronic device to which the power cord is connected.

Figure 15:
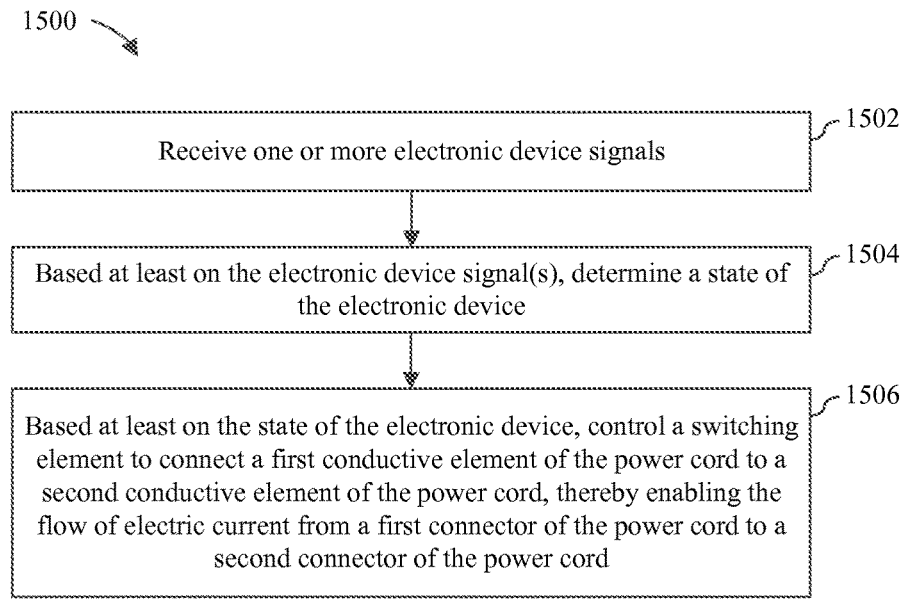

FIG. 15 depicts a flowchart of a method for enabling a flow of electric current through a power cord with in-line power control functionality based at least on a state of an electronic device to which the power cord is connected.

Figure 16:
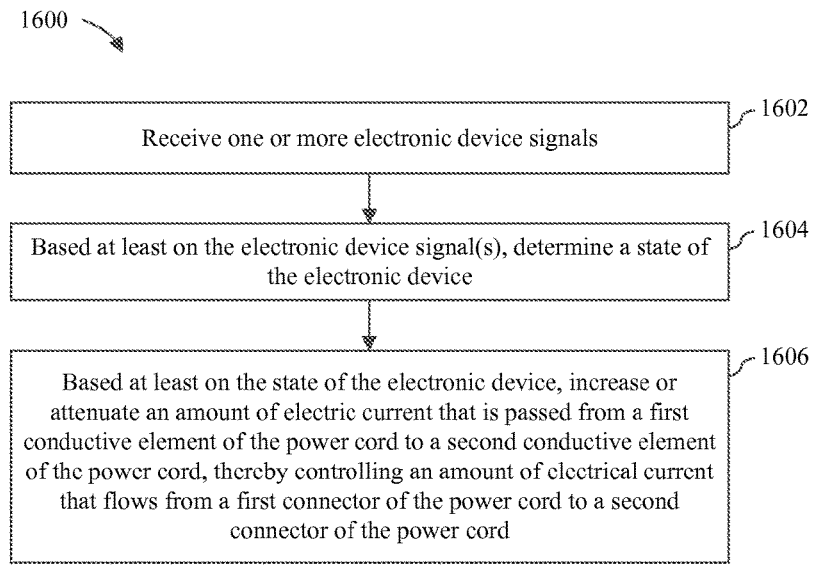

FIG. 16 depicts a flowchart of a method for increasing or attenuating an amount of electric current that is permitted to flow through a power cord with in-line power control functionality based at least on a state of an electronic device to which the power cord is connected.

Figure 17:
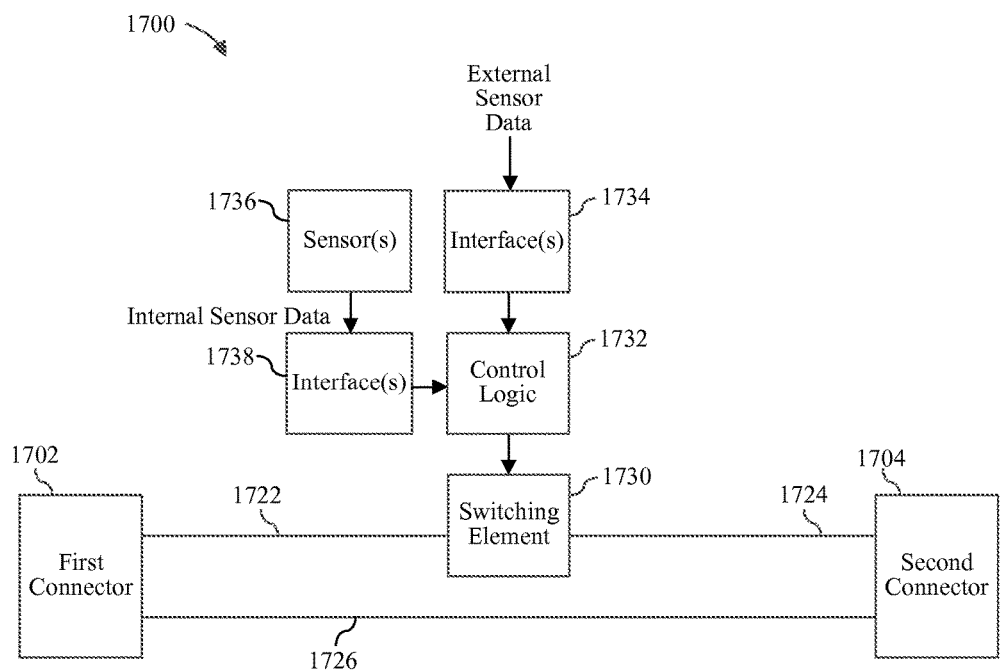

FIG. 17 is a block diagram of a power cord with in-line power control functionality in which control logic in the power cord is configured to activate and/or modify the operation of the power control functionality based at least on an analysis of sensor data.

Figure 18:
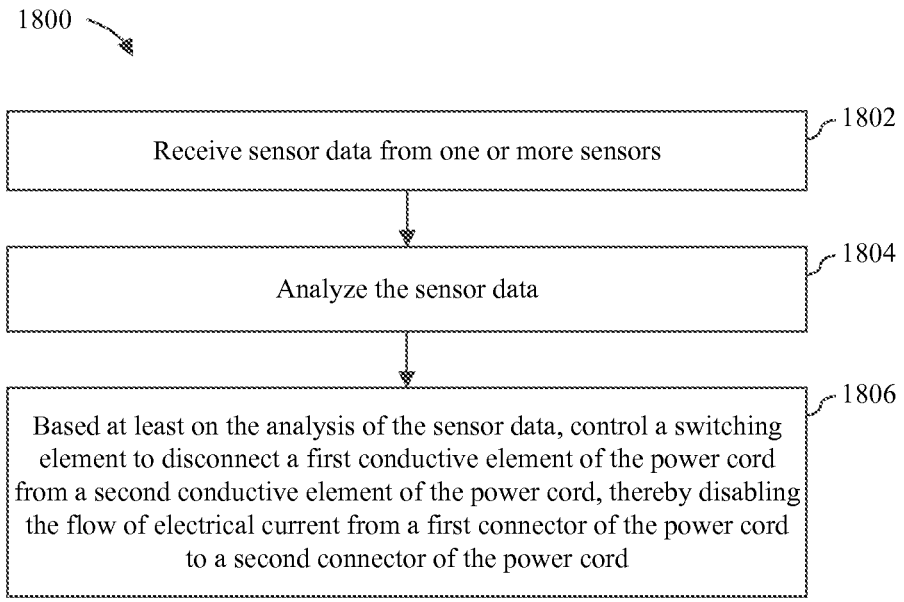

FIG. 18 depicts a flowchart of a method for disabling a flow of electric current through a power cord with in-line power control functionality based at least on an analysis of sensor data.

Figure 19:
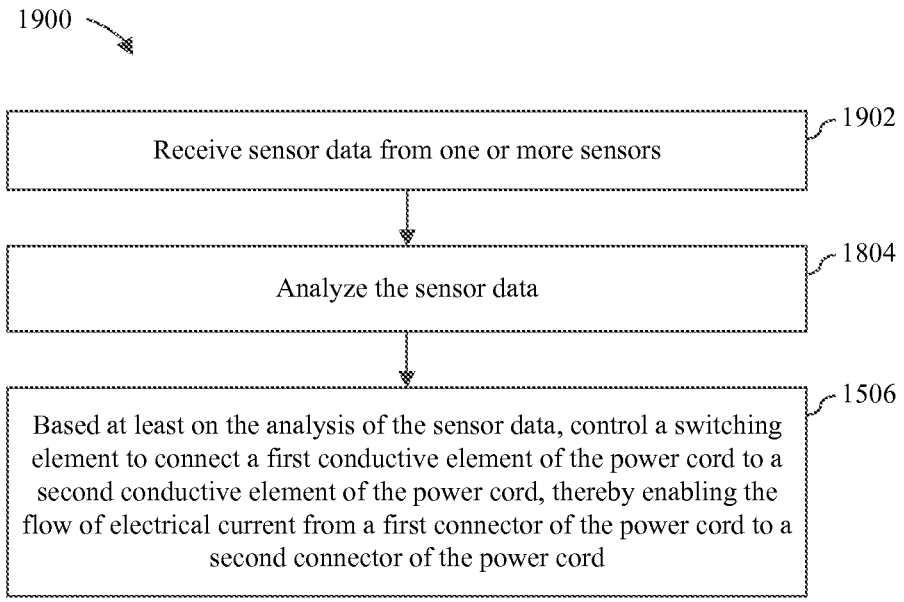

FIG. 19 depicts a flowchart of a method for enabling a flow of electric current through a power cord with in-line power control functionality based at least on an analysis of sensor data.

Figure 20:
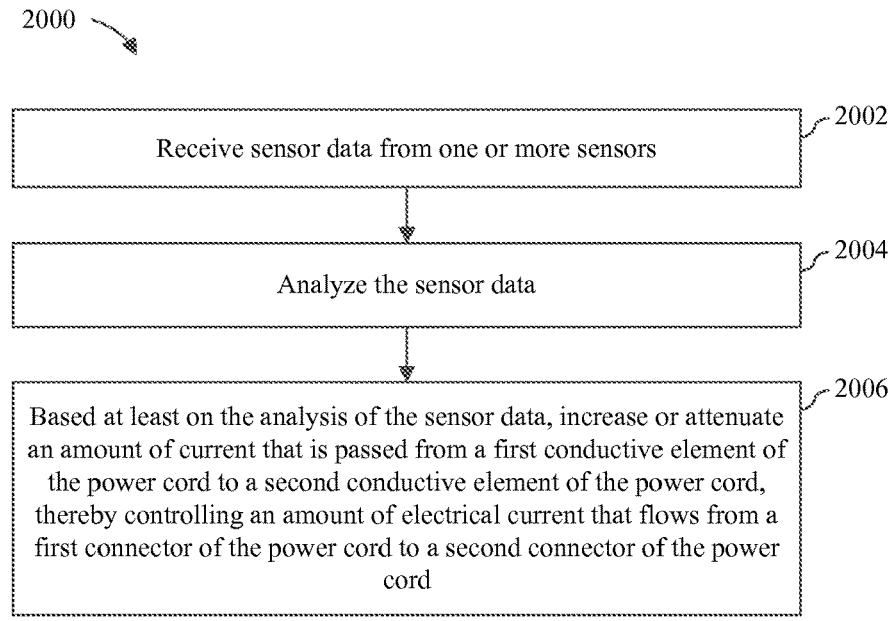

FIG. 20 depicts a flowchart of a method for increasing or attenuating an amount of electric current that is permitted to flow through a power cord with in-line power control functionality based at least on an analysis of sensor data.

Figure 21:
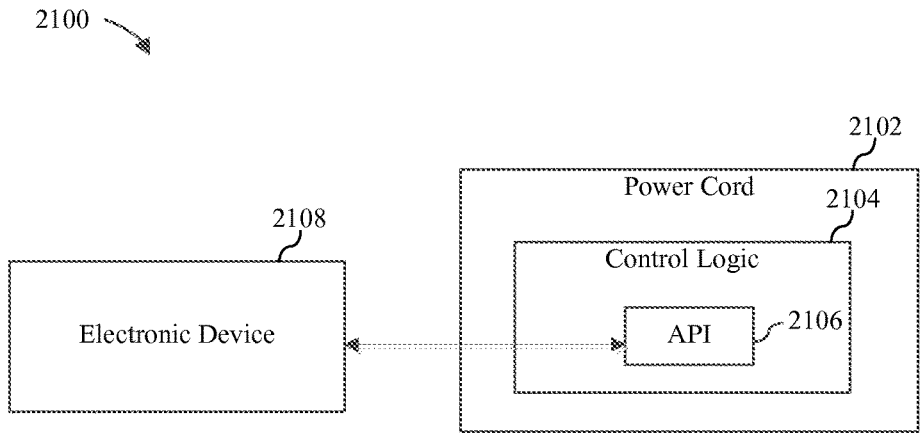

FIG. 21 is a block diagram of a system for programmatically modifying or invoking the features of a power cord within in-line power control functionality.

Figure 22:
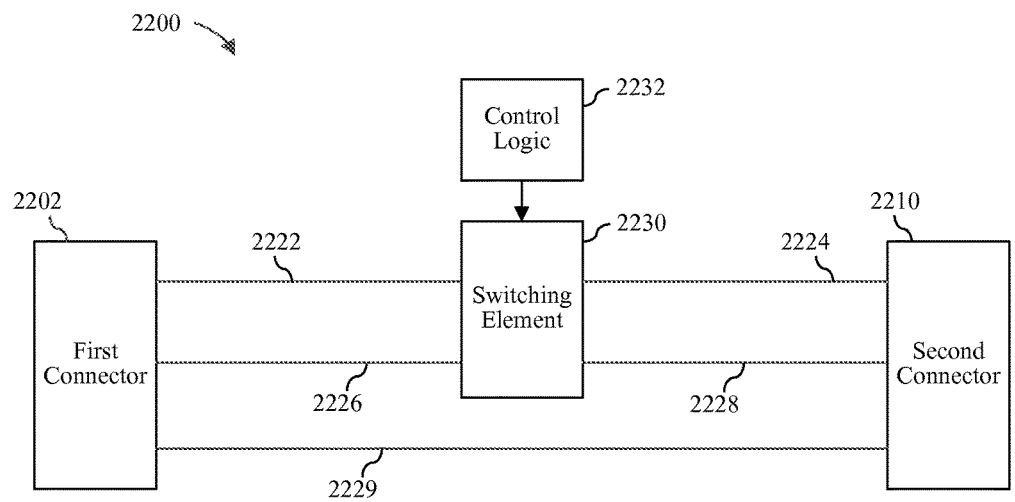

FIG. 22 is a block diagram of a multi-phase power cord in accordance with an embodiment.

Figure 23:
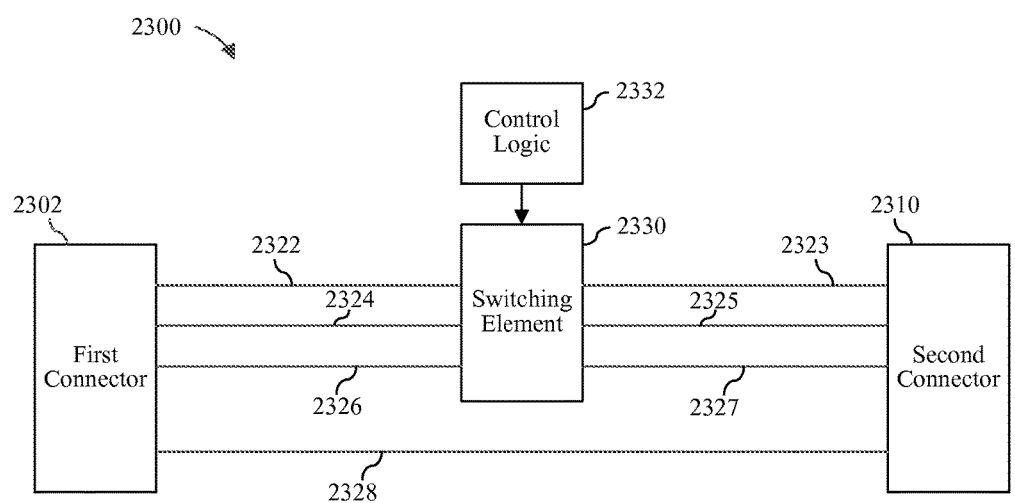

FIG. 23 is a block diagram of a multi-phase power cord in accordance with a further embodiment.

The features and advantages of the embodiments described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The following detailed description discloses numerous example embodiments. The scope of the present patent application is not limited to the disclosed embodiments, but also encompasses combinations of the disclosed embodiments, as well as modifications to the disclosed embodiments.

References in the specification to "one embodiment," "an embodiment," "an example embodiment," or the like, indicate that the embodiment described may include a particular feature, structure, or characteristic, but every embodiment may not necessarily include the particular feature, structure, or characteristic. Moreover, such phrases are not necessarily referring to the same embodiment. Furthermore, when a particular feature, structure, or characteristic is described in connection with an embodiment, it is submitted that it is within the knowledge of persons skilled in the relevant art(s) to implement such feature, structure, or characteristic in connection with other embodiments whether or not explicitly described.

As discussed in the Background Section, above, there are a variety of scenarios in which it is may be desirable to control the manner in which power is provided to an electronic device. For example, in a data center, it may become necessary to shut off and then restore power to a network switch (or other data center equipment) when the network switch locks up, in order to reset it. Given the relatively large size of many conventional data centers, it is not feasible to require data center personnel to manually reset network switches (e.g., by pressing a reset button on the network switch). To address this issue, each network switch may be connected via a power cord to a device called a switched power distribution unit (PDU), which is in turn connected via another power cord to an AC power source. The switched PDU is a box that includes functionality for switching on and off power to each switch, as well as a wired interface that facilitates external, remote control of such switching functionality.

However, the use of the aforementioned switched PDUs entails some significant drawbacks. For example, each switched PDU is typically housed within the same rack as the equipment to which it is connected and will thus consume a portion of the rack space. This means that there will be less space available for other types of equipment in the rack. This reduction in rack space is multiplied across every rack that includes a switched PDU, thereby resulting in a significant reduction in rack space for a data center. Furthermore, the use of the switched PDU provides an added equipment cost that is multiplied across every rack that includes one. Also, each switched PDU includes a number of connectors, each of which is a potential point of failure in the system that delivers power to the network switches. Such connectors include multiple external connectors (e.g., one or more electrical plugs, one or more electrical sockets, and one or more connectors that support a wired connection to a controller device), as well as multiple internal connectors (e.g., connectors for connecting wires associated with each of the external connectors to an internal circuit board).

There are numerous other scenarios in which it may be desirable to control the manner in which power is provided to an electronic device. For example, in an enterprise scenario, it may become necessary to shut off and then restore power to certain malfunctioning office equipment, such as routers, computers, and printers, in order to reset the equipment. The equipment to be reset may not be easily accessible, making a manual reset difficult or even impossible. For example, the equipment may be located relatively far away from the user seeking to reset the equipment or in an area of the office to which the user does not have access. As another example, it may be late at night or on a weekend, and no personnel may be present on site to manually reset the equipment.

As another example, cases of fire, flood or other emergency, it may be desirable to shut off power to equipment for safety reasons automatically or by a user.

In a home scenario, it may become necessary to shut off and then restore power to certain malfunctioning devices, such as set-top boxes, routers, and computers, when such devices are malfunctioning in order to reset those devices. If the equipment is located in a different part of the home than the user, manually resetting the devices may be inconvenient for the user. If the user is away from home, then there may be nobody available to reset the devices.

A power cord with in-line power control functionality is described herein that can address one or more of the foregoing issues, as well as numerous other issues. Examples of such power cords will be described in Section II below. Systems that utilize such a power cord as well as methods that may be performed by such a power cord are also described in Section II. Section III describes some additional exemplary embodiments. Section IV provides some concluding remarks.

II. Power Cord with In-Line Power Control Functionality

Figure 1:
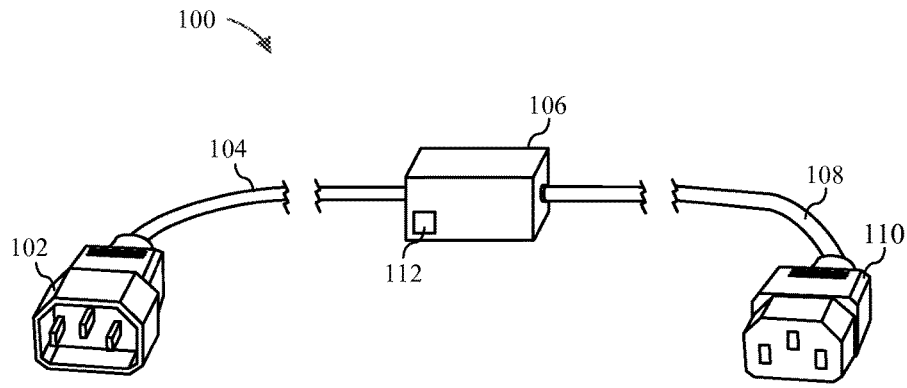
FIG. 1 is a perspective view of a power cord with in-line power control functionality.

FIG. 1 is a perspective view of a power cord 100 with integrated or "in-line" power control functionality in accordance with an example embodiment. As shown in FIG. 1, power cord 100 includes a first connector 102 that is connected to a first end of a first cable 104, a second connector 110 that is connected to a first end of a second cable 108 and an in-line power control block 106 that connects a second end of first cable 104 to a second end of second cable 108. In FIG. 1, a broken view has been used so that the full lengths of first cable 104 and second cable 108 need not be shown.

In the embodiment shown in FIG. 1, first connector 102 comprises an electrical plug (also referred to as a male electrical plug) that is configured to be inserted into a power source (e.g., an alternating current (AC) power source) and to receive an electric current therefrom. In particular, first connector 102 comprises a NEMA 5 type three-prong plug, with a hot prong, a neutral prong and a ground prong, suitable for use in North America and other countries that implement the standards set by the U.S. National Electrical Manufacturers Association. However, it is to be understood that first connector 102 may comprise any one of a wide variety of power cord connector types that are suitable for connecting to a power source and for receiving an electric current therefrom.

In the embodiment shown in FIG. 1, second connector 110 comprises an electrical receptacle (also referred to as a socket or female electrical plug) that is configured to receive a plug of a power consumer (e.g., an AC power consumer) and to transmit an electric current thereto. In particular, second connector 110 comprises a NEMA 5 type three-prong receptacle, with receptacles for receiving a hot prong, a neutral prong, and a ground prong. However, it is to be understood that second connector 110 may comprise any one of a wide variety of power cord connector types suitable for connecting to a power consumer and for transmitting an electric current thereto.

First cable 104 and second cable 108 each comprise a flexible sheath that surrounds a plurality of conductive elements or wires. In particular, first cable 104 encompasses a first hot wire, a neutral wire and a ground wire that are connected, respectively, to the hot prong, neutral prong and ground prong of first connector 102. The first hot wire extends from the hot prong, through first cable 104 and terminates at a switching element that is included within in-line power control block 106. This switching element will be further described in reference to FIG. 2 below. The neutral wire and the ground wire extend from the neutral prong and the ground prong, respectively, through first cable 104, in-line power control block 106 and second cable 108 to connect with corresponding neutral and ground receptacles in second connector 110.

In-line power control block 106 includes a switching element that is operable to selectively connect the first hot wire that extends through first cable 104 to a second hot wire that extends through second cable 108 to connect with a corresponding hot receptacle in second connector 110. When the switching element connects the first hot wire to the second hot wire, electric current is permitted to flow from hot prong of first connector 102 to the hot receptacle of second connector 110. When the switching element disconnects the first hot wire from the second hot wire, the flow of electric current from hot prong of first connector 102 to the hot receptacle of second connector 110 is disabled.

It is to be understood that each wire referred to above may itself comprise multiple interconnected segments of wire. A portion of each wire that extends through first cable 104, in-line power control block 106 and second cable 108 may be substantially surrounded by an insulating material or sheath, thereby providing electrical isolation from the other wires that extend through such components.

As will be discussed below in reference to FIG. 2, in-line power control block 106 further includes control logic for controlling the operation of the switching element and a wired or wireless interface for receiving control signals from an external device that activate and/or modifies the operation of the control logic. In the embodiment of FIG. 1, the interface comprises a wired interface 112.

In-line power control block 106 is "in-line" with respect to power cord 100 in that it is an integrated part of power cord 100 and does not need to be plugged into or otherwise connected to power cord 100 by a user thereof. In-line power control block 106 includes an enclosure that encapsulates the aforementioned switching element, control logic and interface. The enclosure may be manufactured using any of a variety of suitable manufacturing methods including but not limited to potting or over-molding. The enclosure may also comprise a case that is assembled using sonic welding, screws, or some other suitable technique.

In one embodiment, in-line power control block 106 includes a printed circuit board (PCB) upon which is mounted the aforementioned control logic and switching element. In further accordance with such an embodiment, the first hot wire and the second hot wire may be connected to different terminals of the switching element on the PCB. Wired interface 112 may also be coupled to the control logic on the PCB via a suitable connector. Also, the PCB may be used to connect a first segment of the neutral wire that runs through first cable 104 to a second segment of the neutral wire that runs through second cable 108 and to connect a first segment of the ground wire that runs through first cable 104 to a second segment of the ground wire that runs through second cable 108.

Figure 2:
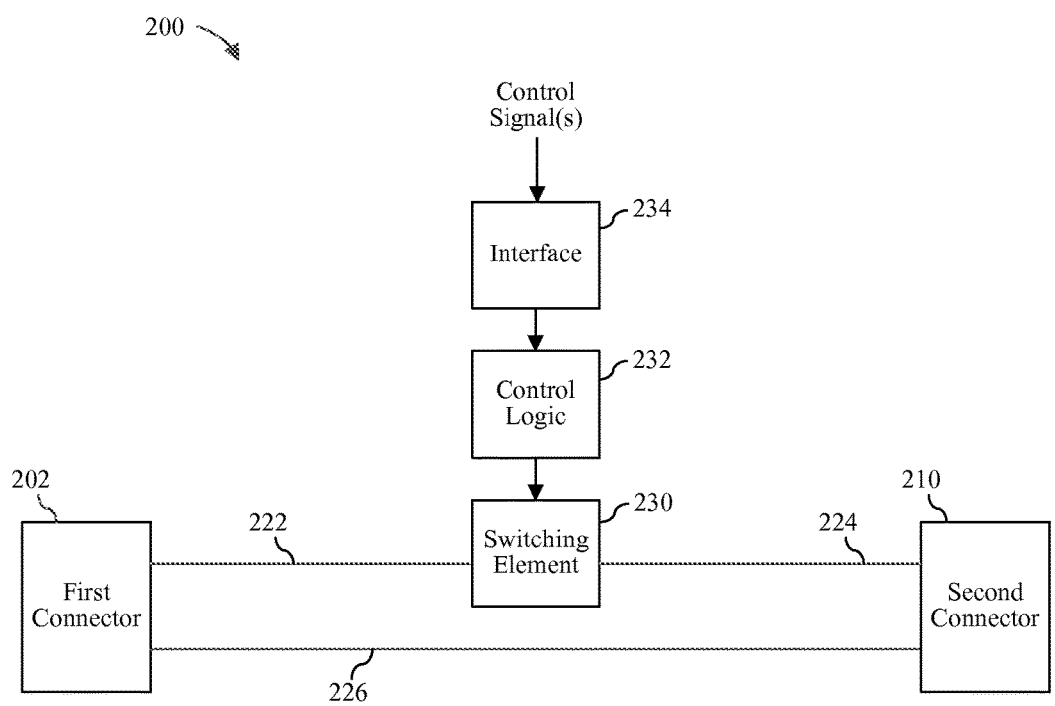
FIG. 2 is a block diagram of a power cord with in-line power control functionality in which the power control functionality is activated and/or controlled by control signal(s) received from an external device via one of an integrated wired or wireless interface.

FIG. 2 is a block diagram of a power cord 200 with in-line power control functionality in accordance with an embodiment in which the power control functionality is activated and/or controlled by control signal(s) received from an external device via one of an integrated wired or wireless interface. Power cord 100 of FIG. 1 may be thought of as one embodiment of power cord 200 of FIG. 2.

As shown in FIG. 2, power cord 200 includes a first connector 202, a second connector 210, a first conductive element 222, a second conductive element 224, a third conductive element 226, a switching element 230, control logic 232, and an interface 234. Each of these components will now be described.

First connector 202 is located at a first end of power cord 200. First connector 202 is analogous to first connector 102 of FIG. 1 and may comprise any one of a wide variety of power cord connector types that are suitable for connecting to a power source and for receiving an electric current therefrom.

Second connector 210 is located at a second end of power cord 200. Second connector 210 is analogous to second connector 110 of FIG. 1 and may comprise any of a wide variety of power cord connector types that are suitable for connecting to a power consumer and for transmitting an electric current thereto.

A first end of first conductive element 222 is connected to first connector 202 and is operable to receive an electric current therefrom. A second end of second conductive element 222 is connected to switching element 230. In one embodiment, first conductive element 222 comprises a metal (e.g., copper) wire, one end of which is connected to a hot prong of first connector 202 and the other end of which is connected to switching element 230.

A first end of second conductive element 224 is connected to switching element 230. A second end of second conductive element 224 is connected to second connector 210 and is operable to transmit an electric current thereto. In one embodiment, second conductive element 224 comprises a metal (e.g., copper) wire, one end of which is connected to switching element 230 and the other end of which is connected to a hot receptacle of second connector 210.

A first end of third conductive element 226 is connected to first connector 202 and a second end of third conductive element 226 is connected to second connector 210. In one embodiment, third conductive element 226 comprises a metal (e.g., copper) wire, one end of which is connected to a neutral prong of first connector 202 and to a neutral receptacle of second connector 210.

Power cord 200 may also optionally include a fourth conductive element that has not been shown in FIG. 2 for the sake of simplicity. A first end of the fourth conductive element may be connected to first connector 202 and a second end of the fourth conductive element may be connected to second connector 210. In one embodiment, the fourth conductive element comprises a metal (e.g., copper) wire, one end of which is connected to a ground prong of first connector 202 and the other end of which is connected to a ground receptacle of second connector 210.

Switching element 230 is operable to connect first conductive element 222 to second conductive element 224, thereby enabling a flow of electric current from first connector 202 to second connector 210. Switching element 230 is also operable to disconnect first conductive element 222 from second conductive element 224, thereby disabling the flow of electric current from first connector 202 to second connector 210.

In one embodiment, switching element 230 comprises a relay. The relay may be, for example, an electromechanical relay or a solid state relay. In further accordance with such an embodiment, the relay may comprise a normally-closed relay in which the inactive or non-energized state of the relay will be one that connects first conductive element 222 to second conductive element 224, and the active or energized state of the relay will be one that disconnects first conductive element 222 from second conductive element 224. However, the relay may also comprise a normally-open relay in which the inactive or non-energized state of the relay will be one that disconnects first conductive element 222 from second conductive element 224, and the active or energized state of the relay will be one that connects first conductive element 222 to second conductive element 224. Furthermore, switching element 230 is not limited to being a relay and may comprise some other type of electrically-operated switching element.

Control logic 232 is connected to switching element 230 and is operable to control switching element 230 to either connect first conductive element 222 to second conductive element 224 or to disconnect first conductive element 222 from second conductive element 224. Control logic 232 is configured to perform these operations based at least on one or more control signals that are received via interface 234 to which control logic 232 is connected. Depending upon the implementation, control logic 232 may be implemented in hardware using analog and/or digital circuits, in software, through the execution of instructions by one or more general purpose or special-purpose processors, or as a combination of hardware and software.

Interface 234 comprises a component that is configured to receive control signals from an external device and to pass such control signals to control logic 232. Interface 234 may comprise a wired interface that is configured to receive the control signals over a wired communication medium. For example, in an embodiment, interface 234 may comprise a power connector, such as a MINI-FIT JR.™ or MICRO-FIT JR.™ power connector (manufactured and sold by Molex Inc. of Lisle, Ill.) that is operable to receive the control signals via a wired communication medium. As another example, interface 234 may comprise a Universal Serial Bus (USB) port that is operable to receive the control signals from a USB cable. As yet another example, interface 234 may comprise an Ethernet port (e.g., an RJ-45 port) that is operable to receive the control signals from an Ethernet cable. However, these examples are not intended to be limiting and a wide variety of other connector or port types may be used to establish a wired connection to an external device for the purpose of receiving control signals therefrom.

Interface 234 may also comprise a radio that is configured to receive the control signals over the air. For example and without limitation, the radio may be configured to receive the control signals in accordance with a radio frequency (RF) short-range communication technology such as BLUETOOTH™ (as described in the various standards developed and licensed by the BLUETOOTH™ Special Interest Group) or a technology such as ZIGBEE® that is based on the IEEE 802.15.4 standard for wireless personal area networks (specifications describing ZIGBEE® are publically available from the ZIGBEE® Alliance). The radio may also be configured to receive the control signals in accordance with any of the well-known IEEE 802.11 protocols. Still further, the radio may be configured to receive the control signals in accordance with a telecommunication technology standard, such as Code Division Multiple Access (CDMA), Time Division Multiple Access (TDMA), Frequency Division Multiple Access (FDMA), Frequency Division Duplex (FDD), Global System for Mobile Communications (GSM), Wideband-CDMA (W-CDMA), Time Division Synchronous CDMA (TD-SCDMA), Long-Term Evolution (LTE), Time-Division Duplex LTE (TDD-LTE) communication, and/or the like. Still other forms of wireless communication technology may be supported by the radio.

In one embodiment in which interface 234 comprises a wired interface and switching element 230 comprises an electromechanical relay, the control signals received via interface 234 comprise positive and negative voltages that are applied to different terminals of a relay coil by control logic 232. The application of these voltages to the relay coil cause a current to flow through the relay coil which in turn causes the relay to change state. Thus, for example, in an embodiment in which the relay comprises a normally-closed relay, when control logic 232 applies the voltages to the relay coil, the relay will disconnect first conductive element 222 from second conductive element 224. The longer the control signals are applied, the longer the two conductive elements will remain disconnected. In further accordance with such an embodiment, when control logic 234 stops applying the voltages to the relay coil, the relay will reconnect first conductive element 222 to second conductive element 224.

As can be seen from the foregoing, the control signals received via interface 234 can be used to selectively control whether or not power cord 200 will conduct power from a power source that is connected to first connector 202 to a power consumer that is connected to second connector 210. In this way, an external device providing the control signals can selectively toggle on or off the delivery of power to the power consumer by sending control signals to power cord 200.

Figure 3:
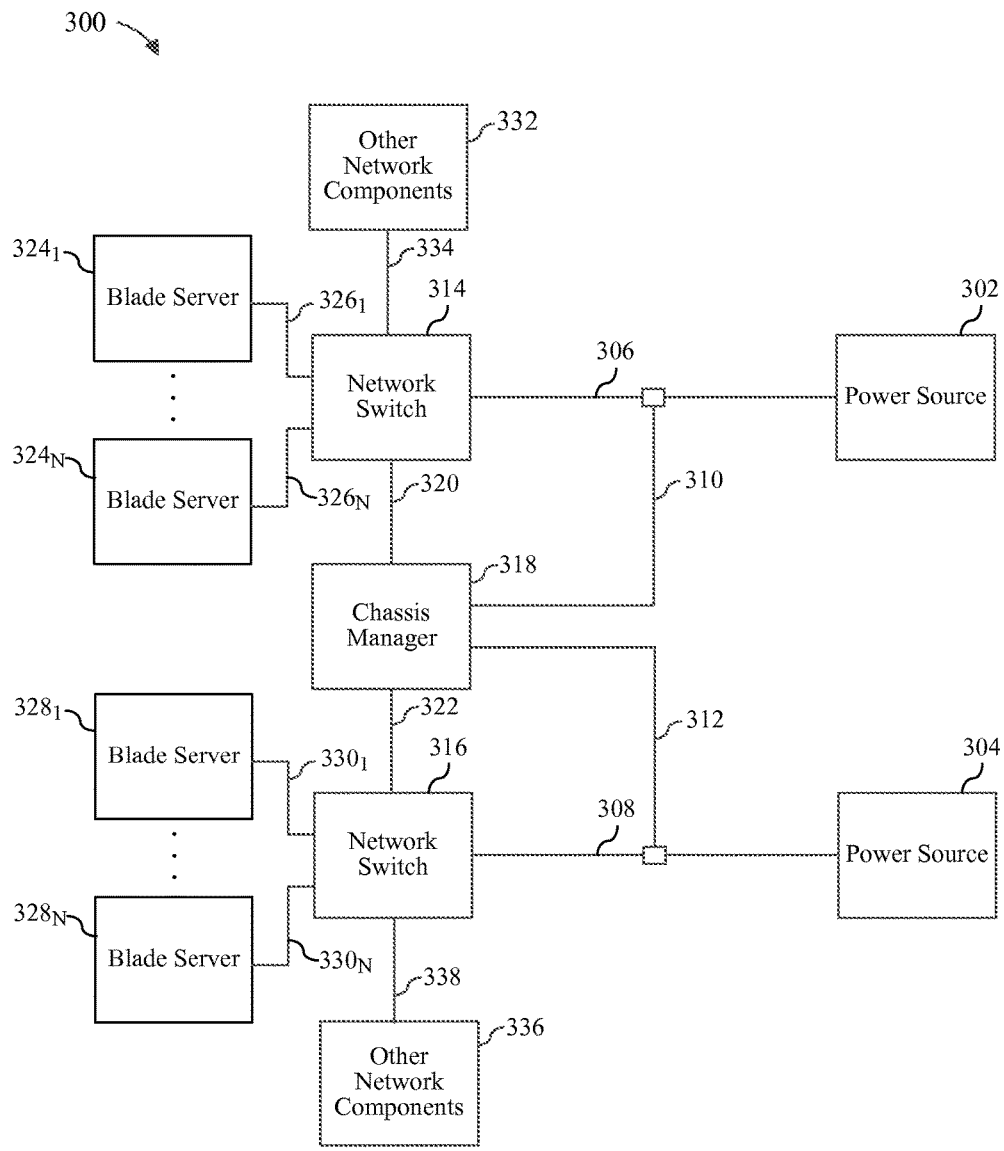
FIG. 3 is a block diagram of a system of networked computers that utilizes power cords with in-line power control functionality to deliver power to respective network switches and in which a chassis manager manages the operation of the power control functionality included in each power cord by sending control signals thereto via a wired communication link.

An example application in which power cord 200 may advantageously be utilized will now be described in reference to FIG. 3. In particular, FIG. 3 is a block diagram of a system 300 of networked computers in which a power cord 306 delivers power from a power source 302 to a network switch 314 and a power cord 308 delivers power from a power source 304 to a network switch 316. Each of power cord 306 and power cord 308 comprises a power cord with in-line power control functionality such as was described above in reference to FIG. 2.

Each of network switch 314 and network switch 316 is connected to a plurality of blade servers through a corresponding Ethernet connection. In particular, network switch 314 is connected to a plurality of blade servers $324_1$-$324_N$ through a corresponding plurality of Ethernet connections $326_1$-$326_N$ and network switch 316 is connected to a plurality of blade servers $328_1$-$328_N$ through a corresponding plurality of Ethernet connections $330_1$-$330_N$. Network switch 314 operates in a well-known manner to manage the flow of data (e.g., Internet Protocol (IP) packets) between blade servers $324_1$-$324_N$ and other network components 332 to which network switch 314 is connected via one or more other Ethernet connections 334. Likewise, network switch 316 operates in a well-known manner to manage the flow of data between blade servers $328_1$-$328_N$ and other network components 336 to which network switch 316 is connected via one or more other Ethernet connections 338.

System 300 further includes a chassis manager 318 that is connected via an Ethernet connection 320 to network switch 314 and that is connected via an Ethernet connection 322 to network switch 316. Chassis manager 318 is also connected to each of blade servers $324_1$-$324_N$ and blade servers $328_1$-$328_N$, although this is not shown in FIG. 3 for the sake of simplicity. Chassis manager 318 is a computing device that is configured to monitor the operational state of each of network switch 314, network switch 316, blade servers $324_1$-$324_N$, and blade servers $328_1$-$328_N$ and to provide information about the operational state of each component to a remote operator or other person. The remote operator may receive such information from chassis manager 318 and interact with chassis manager 318 via a user interface of a computing device that is connected to chassis manager 318 via a network. The user interface may comprise, for example, a graphical user interface (GUI) or a command line interface (CLI).

Each of chassis manager 318, network switch 314, network switch 316, blade servers $324_1$-$324_N$, and blade servers $328_1$-$328_N$ may occupy the same rack in a data center.

As further shown in FIG. 3, chassis manager 318 is also connected via a wired communication medium 310 to an interface of power cord 306. Such interface is analogous to interface 234 of power cord 200. Chassis manager 318 is further configured to transmit control signals via wired communication medium 310 that will cause control logic within power cord 306 to selectively toggle on or off the delivery of power from power source 302 to network switch 314.

Likewise, chassis manager 318 is connected via a wired communication medium 312 to an interface of power cord 308. Such interface is analogous to interface 234 of power cord 200. Chassis manager 318 is further configured to transmit control signals via wired communication medium 312 that will cause control logic within power cord 308 to selectively toggle on or off the delivery of power from power source 304 to network switch 316.

In accordance with the foregoing arrangement, a remote operator may be informed by chassis manager 318 that network switch 314 has locked up and is thus non-operational. To address this problem, the remote operator can issue a command to chassis manager 318 that will cause chassis manager 318 to send control signals to power cord 306. In response to receiving the control signals, power cord 306 will stop providing power from power source 302 to network switch 314 for a predefined period of time and then resume providing power from power source 302 to network switch 314. This will cause network switch 314 to be reset, thereby resolving the problem with that component.

Likewise, in accordance with the foregoing arrangement, a remote operator may be informed by chassis manager 318 that network switch 316 has locked up and is thus non-operational. To address this problem, the remote operator can issue a command to chassis manager 318 that will cause chassis manager 318 to send control signals to power cord 308. In response to receiving the control signals, power cord 308 will stop providing power from power source 304 to network switch 316 for a predefined period of time and then resume providing power from power source 304 to network switch 316. This will cause network switch 316 to be reset, thereby resolving the problem with that component.

The aforementioned approach to resetting each of network switch 314 and network switch 316 is advantageous in that it does not require data center personnel to manually reset the components (e.g., by pressing a reset button on each network switch). Furthermore, because power cords 306 and 308 can be externally controlled to carry out the reset, there is no need to utilize a switched PDU to perform this function. As was discussed above in Section I, such a switched PDU is typically housed within the same rack as the equipment to which it is connected and will thus consume a portion of the rack space. The approach shown in FIG. 3 does not consume any additional rack space and thus more rack space is available for servers or other equipment. Furthermore, eliminating the switched PDU can reduce data center equipment costs, since on a per rack basis, the incremental cost of replacing ordinary power cords with power cords with in-line power control functionality (such as power cords 306 and 308) may be less than the cost of a conventional switched PDU. Finally, as was also noted above in Section I, a switched PDU includes multiple external and internal connectors, each of which is a potential point of failure in the system that delivers power to the network switches. By utilizing the above-described power cords with in-line power control functionality, the number of connectors can be significantly reduced.

Returning now to the description of FIG. 2, in one previously-described embodiment, switching element 230 maintains a disconnect between first conductive element 222 and second conductive element 224 for so long as control signals are being applied via interface 234, since in that embodiment the control signals are being used to energize switching element 230. In accordance with such an embodiment, an external entity (such as chassis manager 318 of FIG. 3) controls the duration of the disconnect. However, in an alternate embodiment, control logic 232 may be capable of independently controlling the duration of the disconnect. In further accordance with such an embodiment, the control signals provided by the external entity can specify how long the desired disconnect should be and control logic 232 can implement the disconnect for the desired time period.

It should be noted in this regard that in certain embodiments, one or more of interface 234, control logic 232 and switching element 230 may be powered by a portion of the power received via first connector 202. In accordance with such embodiments, power cord 200 may further include a power converter that converts a portion of the power received via first connector 202 to a voltage level that is suitable for use by the relevant component(s).

In a further embodiment, power cord 200 may further comprise additional power control functionality. Such additional power control functionality may be part of switching element 230 or connected thereto. This additional power control functionality may be operable to vary an amount of electrical current that is passed from first conductive element 222 to second conductive element 224 when first conductive element 222 is connected to second conductive element 224.

In accordance with such an embodiment, control logic 232 can control such additional power control functionality to selectively increase or attenuate the amount of current that is permitted to flow from first conductive element 222 to second conductive element 224 when those elements are connected. Control logic 232 can perform such selective increasing or attenuation in response to control signals received from an external device via interface 234. In this way, an external entity can selectively control the amount of power that is provided by power cord 200.

One example application of such an embodiment involves a scenario where a power cord with in-line power control functionality supplies power to a plurality of different devices having different operating voltages. In a scenario in which each of the devices is currently powered on, by selective attenuating the power being provided via the power cord, certain ones of the devices can be powered down while keeping other devices powered on. Likewise, in a scenario in which each of the devices is currently powered off, by selectively increasing the power provided via the power cord, certain devices can be powered on without powering on other devices.

Figure 4:
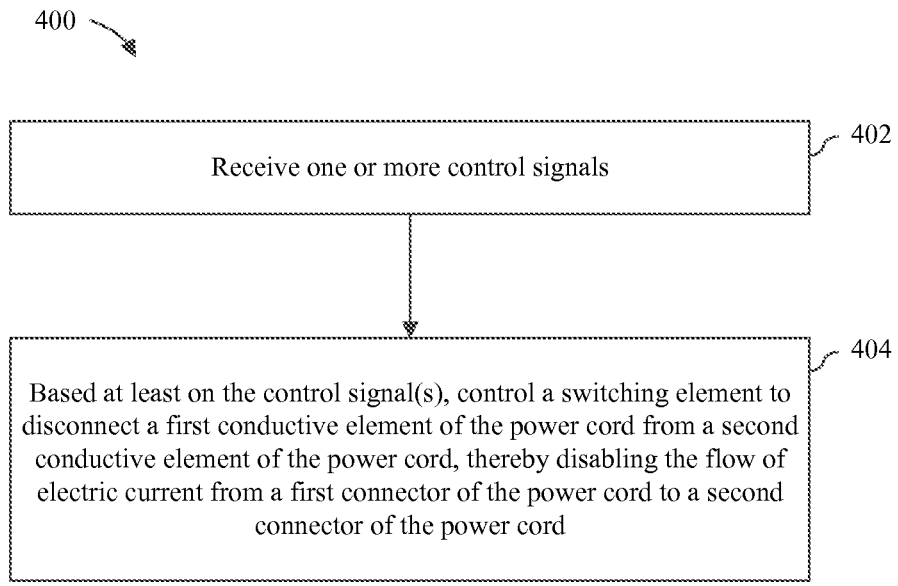
FIG. 4 depicts a flowchart of a method for disabling a flow of electric current through a power cord with in-line power control functionality based at least on one or more control signals received from an external device.
Figure 5:
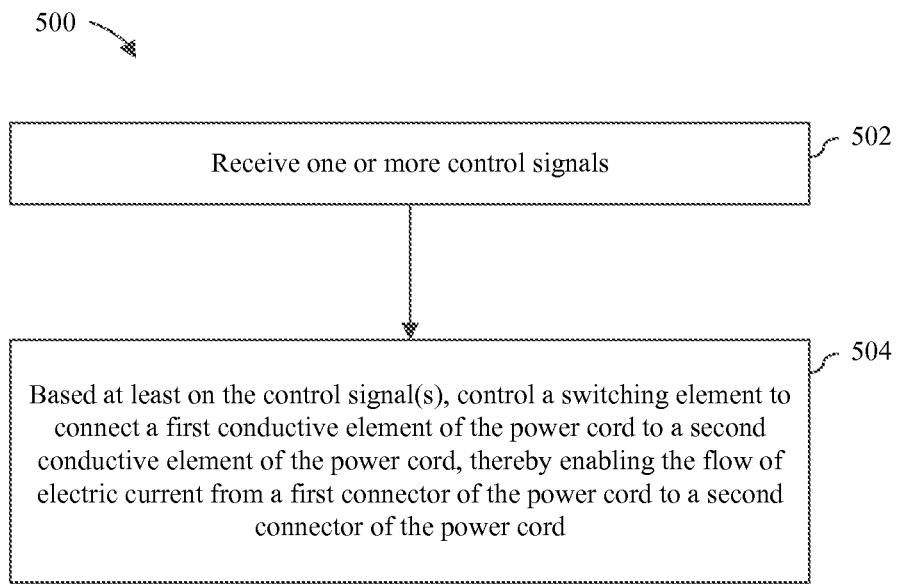
FIG. 5 depicts a flowchart of a method for enabling a flow of electric current through a power cord with in-line power control functionality based at least on one or more control signals received from an external device.
Figure 6:
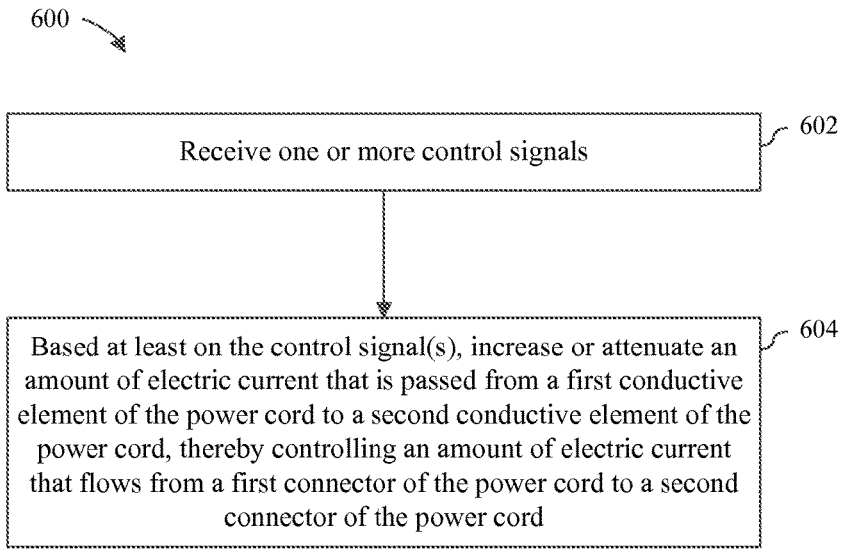
FIG. 6 depicts a flowchart of a method for increasing or attenuating an amount of electric current that is permitted to flow through a power cord with in-line power control functionality based at least on one or more control signals received from an external device.

FIGS. 4-6 are flowcharts that further illustrate a manner of operation of a power cord with in-line power control functionality in accordance with various embodiments. In particular, FIG. 4 depicts a flowchart 400 of a method for disabling a flow of electric current through a power cord with in-line power control functionality based at least on one or more control signals received from an external device. The method of flowchart 400 will be described with continued reference to power cord 200 of FIG. 2. However, the method is not limited to that embodiment.

As shown in FIG. 4, the method of flowchart 400 begins at step 402 in which the power cord receives one or more control signals. For example, as discussed above, interface 234 of power cord 200 receives one or more control signals from an external device.

At step 404, based at least on the control signal(s), the power cord controls a switching element of the power cord to disconnect a first conductive element of the power cord from a second conductive element of the power cord, thereby disabling the flow of electric current from a first connector of the power cord to a second connector of the power cord. For example, as discussed above, control logic 232 of power cord 200, based at least on the control signal(s) received via interface 234, controls switching element 230 to disconnect first conductive element 222 from second conductive element 224, thereby disabling the flow of electric current from first connector 202 to second connector 210.

FIG. 5 depicts a flowchart 500 of a method for enabling a flow of electric current through a power cord with in-line power control functionality based at least on one or more control signals received from an external device. The method of flowchart 500 will be described with continued reference to power cord 200 of FIG. 2. However, the method is not limited to that embodiment.

As shown in FIG. 5, the method of flowchart 500 begins at step 502 in which the power cord receives one or more control signals. For example, as discussed above, interface 234 of power cord 200 receives one or more control signals from an external device.

At step 504, based at least on the control signal(s), the power cord controls a switching element of the power cord to connect a first conductive element of the power cord to a second conductive element of the power cord, thereby enabling the flow of electric current from a first connector of the power cord to a second connector of the power cord. For example, as discussed above, control logic 232 of power cord 200, based at least on the control signal(s) received via interface 234, controls switching element 230 to connect first conductive element 222 to second conductive element 224, thereby enabling the flow of electric current from first connector 202 to second connector 210.

FIG. 6 depicts a flowchart 600 of a method for increasing or attenuating an amount of electric current that is permitted to flow through a power cord with in-line power control functionality based at least on one or more control signals received from an external device. The method of flowchart 600 will be described with continued reference to power cord 200 of FIG. 2. However, the method is not limited to that embodiment.

As shown in FIG. 6, the method of flowchart 600 begins at step 602 in which the power cord receives one or more control signals. For example, as discussed above, interface 234 of power cord 200 receives one or more control signals from an external device.

At step 604, based at least on the control signal(s), the power cord increases or attenuates an amount of electric current that is passed from a first conductive element of the power cord to a second conductive element of the power cord, thereby controlling an amount of electric current that flows from a first connector of the power cord to a second connector of the power cord. For example, as discussed above, control logic 232 of power cord 200, based at least on the control signal(s) received via interface 234, controls power control functionality of power cord 200 to increase or attenuate an amount of electric current that is passed from first conductive element 222 to second conductive element 224, thereby controlling an amount of electric current that flows from first connector 202 to second connector 210.

Figure 7:
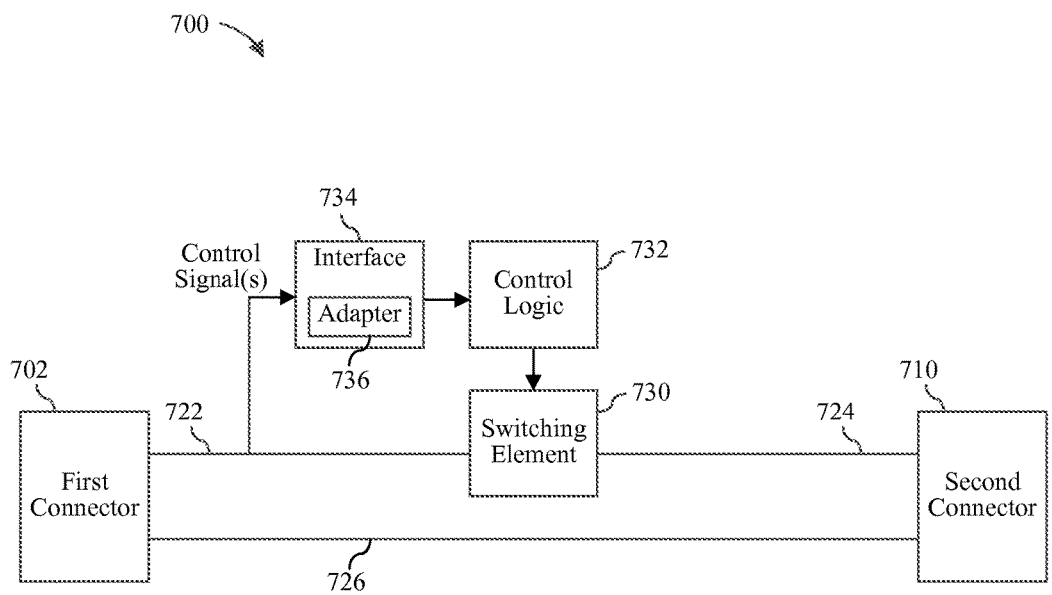
FIG. 7 is a block diagram of a power cord with in-line power control functionality in which the power control functionality is activated and/or controlled by control signal(s) received via one or more conductive elements of the power cord.

FIG. 7 is a block diagram of a power cord 700 with in-line power control functionality in accordance with an alternate embodiment in which the power control functionality is activated and/or controlled by control signal(s) received via one or more conductive elements of the power cord.

As shown in FIG. 7, power cord 200 includes a first connector 702, a second connector 710, a first conductive element 722, a second conductive element 724, a third conductive element 726, a switching element 730, and control logic 732. These components are analogous to first connector 202, second connector 210, first conductive element 222, second conductive element 224, third conductive element 226, switching element 230 and control logic 232 of power cord 200, respectively, and thus need not be described further.

As further shown in FIG. 7, power cord 700 includes an interface 734 that is connected to first conductive element 722 and to control logic 732. Interface 734 is operable to receive one or more control signals that are carried over a power line to first conductive element 722 via first connector 702 and to pass such control signals to control logic 732. Based on such control signals, control logic 732 may activate and or control switching element 730 and/or other power control functionality of power cord 700. For example, based on such control signals, control logic 732 may perform any of the functions described above in step 404 of FIG. 4, step 504 of FIG. 5, or step 604 of FIG. 6. In the embodiment shown in FIG. 7, interface 734 comprises an adapter 736. Adapter 736 is compliant with a powerline networking standard and is operable to receive the control signals carried by first conductive element 722 in accordance with the protocols set forth by such standard. However, it is to be understood that proprietary techniques may be utilized as well.

Although, in FIG. 7, interface 734 is shown as being connected to first conductive element 722, in an alternate embodiment, interface 734 may be connected to a different conductive element of power cord 700 and may be configured to receive control signals therefrom. For example, interface 734 may be connected to a neutral or ground wire of power cord 700 and may be configured to receive control signals therefrom.

In certain embodiments, one or more of interface 734, control logic 732 and switching element 730 may be powered by a portion of the power received via first connector 702. In accordance with such embodiments, power cord 700 may further include a power converter that converts a portion of the power received via first connector 702 to a voltage level that is suitable for use by the relevant component(s).

Figure 8:
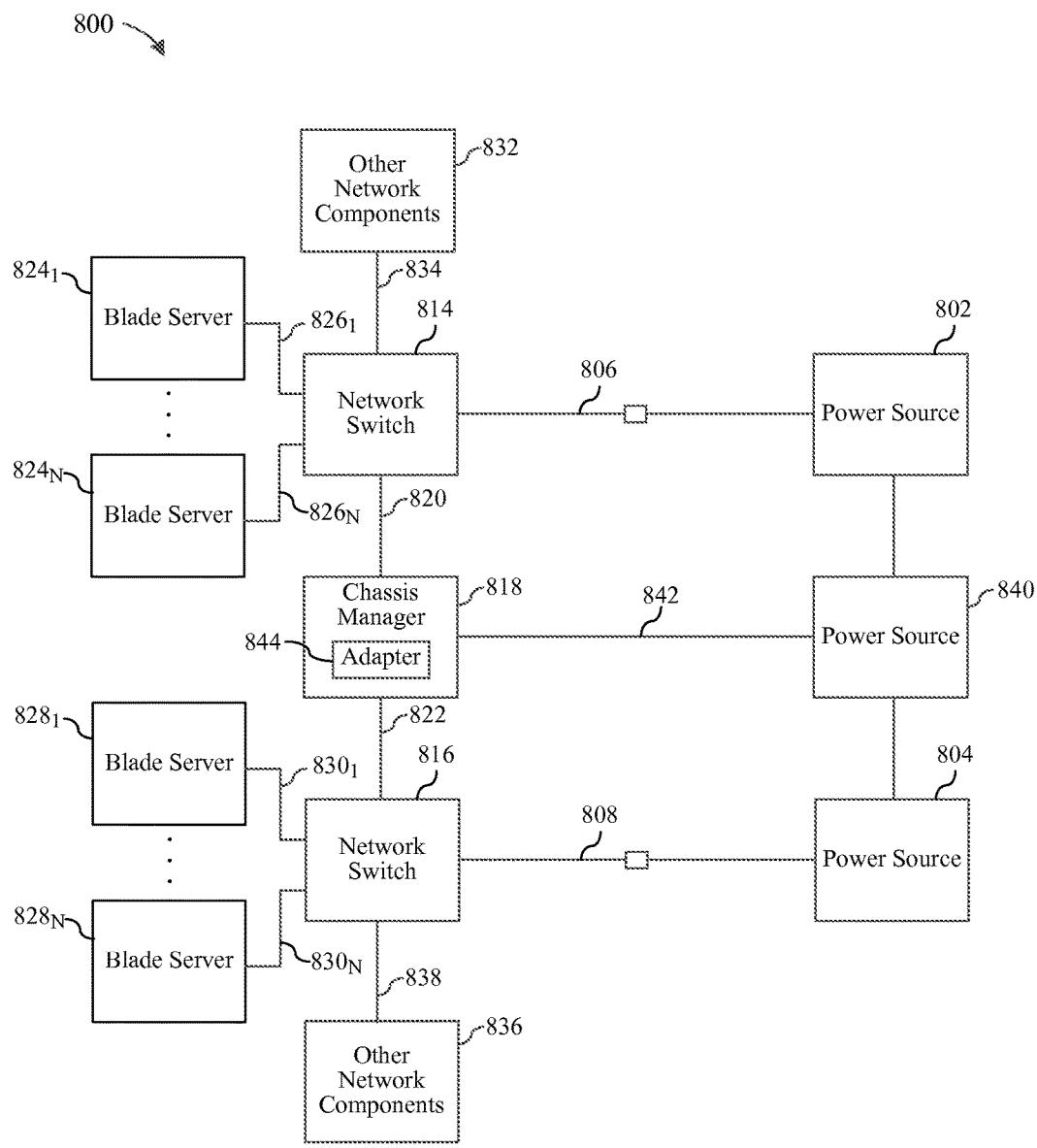
FIG. 8 is a block diagram of a system of networked computers that utilizes power cords with in-line power control functionality to deliver power to respective network switches and in which a chassis manager manages the operation of the power control functionality located in each power cord by sending control signals thereto via a power-line network.

An example application in which power cord 700 may advantageously be utilized will now be described in reference to FIG. 8. In particular, FIG. 8 is a block diagram of a system 800 of networked computers in which a power cord 806 delivers power from a power source 802 to a network switch 814 and a power cord 808 delivers power from a power source 804 to a network switch 816. Each of power cord 806 and power cord 808 comprises a power cord with in-line power control functionality such as was described above in reference to FIG. 7.

Each of network switch 814 and network switch 816 is connected to a plurality of blade servers through a corresponding Ethernet connection. In particular, network switch 814 is connected to a plurality of blade servers $824_1$-$824_N$ through a corresponding plurality of Ethernet connections $826_1$-$826_N$ and network switch 816 is connected to a plurality of blade servers $828_1$-$828_N$ through a corresponding plurality of Ethernet connections $830_1$-$830_N$. Network switch 814 operates in a well-known manner to manage the flow of data between blade servers $824_1$-$824_N$ and other network components 832 to which network switch 814 is connected via one or more other Ethernet connections 834. Likewise, network switch 816 operates in a well-known manner to manage the flow of data between blade servers $828_1$-$828_N$ and other network components 836 to which network switch 816 is connected via one or more other Ethernet connections 838.

System 800 further includes a chassis manager 818 that is connected via an Ethernet connection 820 to network switch 814 and that is connected via an Ethernet connection 822 to network switch 816. Chassis manager 818 is also connected to each of blade servers $824_1$-$824_N$ and blade servers $828_1$-$828_N$, although this is not shown in FIG. 8 for the sake of simplicity. Chassis manager 818 is a computing device that is configured to monitor the operational state of each of network switch 814, network switch 816, blade servers $824_1$-$824_N$, and blade servers $828_1$-$828_N$ and to provide information about the operational state of each component to a remote operator or other person. The remote operator may receive such information from chassis manager 818 and interact with chassis manager 818 via a user interface (e.g., a GUI or CLI) of a computing device that is connected to chassis manager 818 via a network.

Each of chassis manager 818, network switch 814, network switch 816, blade servers $824_1$-$824_N$, and blade servers $828_1$-$828_N$ may occupy the same rack in a data center.

As further shown in FIG. 8, chassis manager 818 is also connected via a power cord 842 to a power source 840 and is powered thereby. Power source 840 is connected via one or more conductive elements to each of power source 802 and power source 804. Chassis manager 818 includes an adapter 844 that enables chassis manager 818 to transmit control signals that are carried to power cord 806 over one or more conductive elements of power cord 842, power source 840 and power source 802. At power cord 806, the control signals are received by an adapter (e.g., a powerline network adapter) of power cord 806. Such adapter is analogous to adapter 736 of power cord 700. Such control signals may cause control logic within power cord 806 to selectively toggle on or off the delivery of power from power source 802 to network switch 814.

Likewise, adapter 844 enables chassis manager 818 to transmit control signals that are carried to power cord 808 over one or more conductive elements of power cord 842, power source 840 and power source 804. At power cord 808, the control signals are received by an adapter (e.g., a powerline network adapter) of power cord 808. Such adapter is analogous to adapter 736 of power cord 700. Such control signals may cause control logic within power cord 808 to selectively toggle on or off the delivery of power from power source 804 to network switch 816.

In accordance with the foregoing arrangement, a remote operator may be informed by chassis manager 818 that network switch 814 has locked up and is thus non-operational. To address this problem, the remote operator can issue a command to chassis manager 818 that will cause chassis manager 818 to send control signals to power cord 806. In response to receiving the control signals, power cord 806 will stop providing power from power source 802 to network switch 814 for a predefined period of time and then resume providing power from power source 802 to network switch 814. This will cause network switch 814 to be reset, thereby resolving the problem with that component.

Likewise, in accordance with the foregoing arrangement, a remote operator may be informed by chassis manager 818 that network switch 816 has locked up and is thus non-operational. To address this problem, the remote operator can issue a command to chassis manager 818 that will cause chassis manager 818 to send control signals to power cord 808. In response to receiving the control signals, power cord 808 will stop providing power from power source 804 to network switch 816 for a predefined period of time and then resume providing power from power source 804 to network switch 816. This will cause network switch 816 to be reset, thereby resolving the problem with that component.

The aforementioned approach to resetting each of network switch 814 and network switch 816 provides essentially all of the advantages discussed above with respect to system 300 of FIG. 3. Furthermore, this approach also eliminates the need for any extra wiring to facilitate communication between chassis manager 818 and each of power cord 806 and power cord 808. That is because this approach can leverage an existing power distribution infrastructure of a data center to carry control signals from a chassis manager or other controller device to any number of power cords with in-line power control functionality.

An example residential application in which power cord 700 may advantageously be utilized will now be described in reference to FIG. 9. In particular, FIG. 9 is a block diagram of a system 900 of networked residential devices and equipment that utilizes power cords with in-line power control functionality to deliver power to respective devices and equipment and in which a service provider or control device manages the operation of power control functionality located in each power cord by sending control signals thereto via a power line network.

Figure 9:
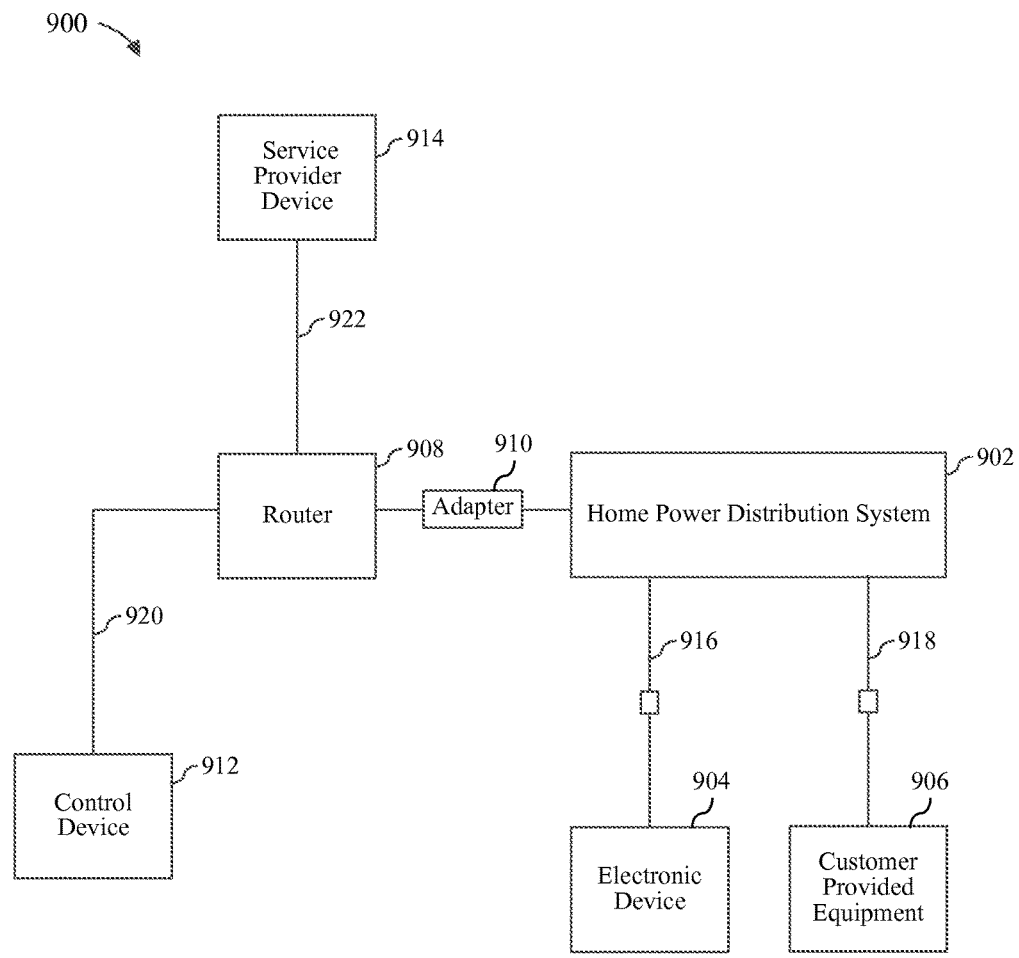
FIG. 9 is a block diagram of a system of networked residential devices and equipment that utilizes power cords with in-line power control functionality to deliver power to respective devices and equipment and in which a service provider or control device manages the operation of power control functionality located in each power cord by sending control signals thereto via a powerline network.

As shown in FIG. 9, system 900 includes a home power distribution system 902 that delivers power via a power cord 916 to an electronic device 904. Home power distribution system 902 also delivers power via a power cord 918 to customer premises equipment (CPE) 906. Each of power cord 916 and power cord 918 comprises a power cord with in-line power control functionality such as was described above in reference to FIG. 7.

Consumer electronic device 904 may comprise any of a myriad of electronic devices that may be purchased for use in a home, including but by no means limited to a lamp, a thermostat, a television, a DVD player, an audio/video (A/V) receiver, a camera, a computer, a printer, a gaming console, a fan, an air conditioner, a refrigerator, a stove, a washing machine, or a dryer.

In system 900, a control device 912 is connected via a wired (e.g., Ethernet) and/or wireless (e.g., 802.11) network connection 920 to a router 908 located in the home. Control device 912 may comprise any type of device capable of communicating with router 908. By way of example and without limitation, control device 912 may comprise a computer, a tablet, a smart phone, a remote control device, or the like that is operable to communicate with router 908 using Internet Protocol (IP). Control device 912 may be located in the home or outside the home.

In further accordance with this scenario, control device 912 is operable to send control signals to router 908 and router 908 is operable pass such signals to a powerline network adapter 910. Powerline network adapter 910 is operable to convert the control signals into a form suitable for transmission over a power line and then transmit such converted control signals to home power distribution system 902. The control signals will then be carried by home power distribution system 902 to power cord 916. At power cord 916, the control signals are received by an adapter (e.g., a powerline network adapter) of power cord 916. Such adapter is analogous to adapter 736 of power cord 700. Such control signals may cause control logic within power cord 916 to selectively toggle on or off the delivery of power from home power distribution system 902 to electronic device 904.

System 900 thus advantageously enables a user to easily turn on and shut off power to electronic devices within the home even when such electronic devices are not proximally located to the user and even when such devices are not configured to work with IP-based or powerline-network-based technology.

For example, as was discussed in the Background Section above, in a home scenario, it may become necessary to shut off and then restore power to certain malfunctioning devices in order to reset those devices. If the equipment is located in a different part of the home than the user, manually resetting the devices may be inconvenient for the user, and if the user is away from home, then there may be nobody available to reset the devices. The configuration of system 900 shown in FIG. 9 addresses these issues by providing a user with a simple and easy way to remotely shut off and restore power to such malfunctioning devices.

As was previously mentioned, in system 900, home power distribution system 902 delivers power via power cord 918 to CPE 906. CPE 906 may comprise any type of electrically-powered equipment that is utilized in a home and that facilitates the providing of a service by a service provider to a resident or occupant of the home. CPE 906 may comprise for example and without limitation, a cable or satellite television set top box, a Digital Subscriber Line (DSL) or other broadband Internet router, a Voice-over-IP (VoIP) base station, a telephone handset, a security system, or a furnace.

In system 900, a service provider device 914 that is owned and/or operated by the service provider associated with CPE 906 is connected via a network (e.g., the Internet) to router 908. Service provider device 914 may be located outside the home. For example, service provider device 914 may comprise a computer located at an office owned or occupied by the service provider. As another example, service provider device 914 may comprise a portable device (e.g., tablet, smart phone or other portable device) carried by an employee of the service provider. However, these examples are not intended to be limiting.

In further accordance with this scenario, service provider device 914 is operable to send control signals to router 908 and router 908 is operable pass such signals to powerline network adapter 910. Powerline network adapter 910 is operable to convert the control signals into a form suitable for transmission over a power line and then transmit such converted control signals to home power distribution system 902. The control signals will then be carried by home power distribution system 902 to power cord 918. At power cord 918, the control signals are received by an adapter (e.g., a powerline network adapter) of power cord 918. Such adapter is analogous to adapter 736 of power cord 700. Such control signals may cause control logic within power cord 918 to selectively toggle on or off the delivery of power from home power distribution system 902 to CPE 906.

System 900 thus advantageously enables a service provider to easily turn on and shut off power to CPE within the home. One example benefit of this feature is that it can enable the service provider to help remotely troubleshoot CPE when it is malfunctioning. Another example benefit of this feature is that it can enable the service provider to shut down malfunctioning CPE for safety reasons. Yet another example benefit of this feature is that it can enable the service provider to activate the CPE on behalf of the home owner or occupant when requested to do so by the homeowner or occupant. In further accordance with this an example, if a homeowner leaves home and forgets to turn on his/her security system, the homeowner can notify the security system provider and the security system provider can activate the system on behalf of the homeowner. These are only a few examples, however, as there are numerous other beneficial uses of this technology.

The foregoing technology can also be easily adapted to an office environment in order to facilitate the remote powering up, powering down, and resetting of office equipment such as routers, computers, and printer.

FIG. 10 is a block diagram of a power cord 1000 with in-line power control functionality in accordance with an alternate embodiment in which control logic in the power cord is configured to activate and/or modify the operation of the power control functionality based at least on the state of an electronic device to which the power cord is connected. As will be discussed below, the state of the electronic device is determined based at least in part on signals received from the electronic device via one of an integrated wired or wireless interface.

As shown in FIG. 10, power cord 1000 includes a first connector 1002, a second connector 1010, a first conductive element 1022, a second conductive element 1024, a third conductive element 1026, a switching element 1030, control logic 1032 and an interface 1034. Except for certain differences that will be discussed below, these components are substantially similar to first connector 202, second connector 210, first conductive element 222, second conductive element 224, third conductive element 226, switching element 230, control logic 232 and interface 234 of power cord 200, respectively, and thus a detailed description of each component need not be provided.

A first difference between power cord 1000 and power cord 200 is that interface 1034 of power cord 1000 is operable to receive one or more electronic device signals from an electronic device that is connected (directly or indirectly) to second connector of power cord 1010. A second difference between power cord 1000 and power cord 200 is that control logic 1032 of power cord 1000 includes device monitoring logic 1036. Device monitoring logic 1036 is configured to determine a state of the electronic device that is connected to second connector 1010 based on the electronic device signal(s) received via interface 1034. Control logic 1032 is configured to, based at least on the state of the electronic device, control switching element 1030 to either connect first conductive element 1022 to second conductive element 1024, thereby enabling a flow of electric current from first connector 1002 to second connector 1010, or to disconnect first conductive element 1022 from second conductive element 1024, thereby disabling the flow of electric current from first connector 1002 to second connector 1010.

In a further embodiment, power cord 1000 may further comprise additional power control functionality. Such additional power control functionality may be part of switching element 1030 or connected thereto. This additional power control functionality may be operable to vary an amount of electrical current that is passed from first conductive element 1022 to second conductive element 1024 when first conductive element 1022 is connected to second conductive element 1024.

In accordance with such an embodiment, control logic 1032 can control such additional power control functionality to selectively increase or attenuate the amount of current that is permitted to flow from first conductive element 1022 to second conductive element 1024 when those elements are connected. Control logic 1032 can perform such selective increasing or attenuation in response to the state of an electronic device connected to second connector 1010 as determined by device monitoring logic 1036.

In certain embodiments, one or more of interface 1034, control logic 1032 and switching element 1030 may be powered by a portion of the power received via first connector 1002. In accordance with such embodiments, power cord 1000 may further include a power converter that converts a portion of the power received via first connector 1002 to a voltage level that is suitable for use by the relevant component(s).

An example application in which power cord 1000 may advantageously be utilized will now be described in reference to FIG. 11. In particular, FIG. 11 is a block diagram of a system 1100 in which a power cord 1106 with in-line power control functionality is used to provide power from a power source 1102 to a network switch 1106. Power cord 1106 comprises a power cord with in-line power control functionality such as was described above in reference to FIG. 10.

Network switch 1104 is configured to periodically, intermittently, or continuously send electronic device signal(s) to power cord 1106 via a wired or wireless communication link 1108. Such electronic device signal(s) are received by device monitoring logic within power cord 1106 and used thereby to determine a state of network switch 1104. Such device monitoring logic is analogous to device monitoring logic 1036 of power cord 1000. If the device monitoring logic determines that network switch 1104 is in a normal, stable or good operating state, then power cord 1106 will continue to provide power from power source 1102 to network switch 1104. However, if the device monitoring logic determines that network switch 1104 is in an impaired, malfunctioning or bad state (e.g., locked up), then power cord 1106 will stop providing power from power source 1102 to network switch 1104 for a predefined period of time and then resume providing power from power source 1102 to network switch 1104. This will cause network switch 1104 to be reset, thereby resolving the problem with that component.

In one embodiment, the device monitoring logic within power cord 1106 may be configured to determine that network switch 1104 is in an impaired, malfunctioning or bad state based on at least a cessation of electronic device signals from network switch 1104. For example, if network switch 1104 locks up, it may be rendered incapable of transmitting electronic device signals to power cord 1106. This cessation of electronic device signals can signify to the device monitoring logic that network switch 1104 needs to be reset.

FIG. 12 is a block diagram of an alternate power cord 1200 with in-line power control functionality in which control logic in the power cord is configured to activate and/or modify the operation of the power control functionality based at least on the state of an electronic device to which the power cord is attached. In the embodiment shown in FIG. 12, the state of the electronic device is determined based at least in part on signals received from the electronic device via one or more conductive elements of the power cord.

As shown in FIG. 12, power cord 1200 includes a first connector 1202, a second connector 1210, a first conductive element 1222, a second conductive element 1224, a third conductive element 1226, a switching element 1230, control logic 1232 and device monitoring logic 1236. These components are analogous to first connector 1002, second connector 1010, first conductive element 1022, second conductive element 1024, third conductive element 1026, switching element 1030, control logic 1032 and device monitoring logic 1036 of power cord 1000, respectively, and thus need not be described further.

As further shown in FIG. 12, power cord 1200 includes an interface 1234 that is connected to second conductive element 1224 and to control logic 1232. Interface 1234 is operable to receive one or more electronic device signals that originate from an electronic device that is connected (directly or indirectly) to second connector 1210 and that are carried to second conductive element 1224 via second connector 1210. Interface 1234 is further operable to pass such electronic device signals to device monitoring logic 1236 of control logic 1232. Based at least on such electronic device signals, device monitoring logic 1236 may determine a state of the electronic device. Based at least on the state of the electronic device, control logic 1232 may operate to connect first conductive element 1222 to second conductive element 1224, disconnect first conductive element 1222 from second conductive element 1224, or increase or attenuate an amount of current that is permitted to pass from first conductive element 1222 to 1224. In the embodiment shown in FIG. 12, interface 1234 comprises an adapter 1236 that is compliant with a powerline networking standard and is operable to receive the control signals carried by second conductive element 1224 in accordance with the protocols set forth by such standard. However, proprietary techniques may be utilized as well.

Although, in FIG. 12, interface 1234 is shown as being connected to second conductive element 1223, in an alternate embodiment, interface 1234 may be connected to a different conductive element of power cord 1200 and may be configured to receive control signals therefrom. For example, interface 1234 may be connected to a neutral or ground wire of power cord 1200 and may be configured to receive control signals therefrom.

In certain embodiments, one or more of interface 1234, control logic 1232 and switching element 1230 may be powered by a portion of the power received via first connector 1202. In accordance with such embodiments, power cord 1200 may further include a power converter that converts a portion of the power received via first connector 1202 to a voltage level that is suitable for use by the relevant component(s).

An example application in which power cord 1200 may advantageously be utilized will now be described in reference to FIG. 13. In particular, FIG. 13 is a block diagram of a system 1300 in which a power cord 1306 with in-line power control functionality is used to provide power from a power source 1302 to a network switch 1306. Power cord 1306 comprises a power cord with in-line power control functionality such as was described above in reference to FIG. 12.

Network switch 1304 is configured to periodically, intermittently, or continuously send electronic device signal(s) to power cord 1306 via a conductive element within power cord 1306. To this end, network switch 1308 contains or is connected to a powerline network adapter 1308 that converts the relevant electronic device signal(s) into a form suitable for transmission over a conductive element and then transmits the electronic device signal(s) to power cord 1306 via a connector thereof. Such electronic device signal(s) are received by device monitoring logic within power cord 1306 and used thereby to determine a state of network switch 1304. Such device monitoring logic is analogous to device monitoring logic 1236 of power cord 1200. If the device monitoring logic determines that network switch 1304 is in a normal, stable or good operating state, then power cord 1306 will continue to provide power from power source 1302 to network switch 1304. However, if the device monitoring logic determines that network switch 1304 is in an impaired, malfunctioning or bad state (e.g., locked up), then power cord 1306 will stop providing power from power source 1302 to network switch 1304 for a predefined period of time and then resume providing power from power source 1302 to network switch 1304. This will cause network switch 1304 to be reset, thereby resolving the problem with that component.

In one embodiment, the device monitoring logic within power cord 1306 may be configured to determine that network switch 1304 is in an impaired, malfunctioning or bad state based on at least a cessation of electronic device signals from network switch 1304. For example, if network switch 1304 locks up, it may be rendered incapable of transmitting electronic device signals to power cord 1306. This cessation of electronic device signals can signify to the device monitoring logic that network switch 1304 needs to be reset.

FIGS. 14-16 are flowcharts that further illustrate a manner of operation of a power cord with in-line power control functionality in accordance with various embodiments. In particular, FIG. 14 depicts a flowchart 1400 of a method for disabling a flow of electric current through a power cord with in-line power control functionality based at least on a state of an electronic device to which the power cord is connected. The method of flowchart 1400 will be described with continued reference to power cord 1000 of FIG. 10 and power cord 1200 of FIG. 12. However, the method is not limited to those embodiments.

As shown in FIG. 14, the method of flowchart 1400 begins at step 1402 in which the power cord receives one or more electronic device signals. For example, as discussed above, interface 1034 of power cord 1000 receives one or more electronic device signals from an electronic device that is connected to second connector 1010 of power cord 1000. As also discussed above, interface 1234 of power cord 1200 receives one or more electronic device signals from an electronic device that is connected to second connector 1210 of power cord 1200.

At step 1404, based at least on the electronic device signal(s), the power cord determines a state of the electronic device. For example, as discussed above, based at least on the electronic device signal(s), device monitoring logic 1036 within power cord 1000 determines a state of the electronic device. As also discussed above, based at least on the electronic device signals, device monitoring logic 1236 within power cord 1200 determines a state of the electronic device.

At step 1406, based at least on the state of the electronic device, the power cord controls a switching element of the power cord to disconnect a first conductive element of the power cord from a second conductive element of the power cord, thereby disabling the flow of electric current from a first connector of the power cord to a second connector of the power cord. For example, as discussed above, control logic 1032 of power cord 1000, based at least on the state of the electronic device, controls switching element 1030 to disconnect first conductive element 1022 from second conductive element 1024, thereby disabling the flow of electric current from first connector 1002 to second connector 1010. As also discussed above, control logic 1232 of power cord 1200, based at least on the state of the electronic device, controls switching element 1230 to disconnect first conductive element 1222 from second conductive element 1224, thereby disabling the flow of electric current from first connector 1202 to second connector 1210.

FIG. 15 depicts a flowchart 1500 of a method for enabling a flow of electric current through a power cord with in-line power control functionality based at least on a state of an electronic device to which the power cord is connected. The method of flowchart 1500 will be described with continued reference to power cord 1000 of FIG. 10 and power cord 1200 of FIG. 12. However, the method is not limited to those embodiments.

As shown in FIG. 15, the method of flowchart 1500 begins at step 1502 in which the power cord receives one or more electronic device signals. For example, as discussed above, interface 1034 of power cord 1000 receives one or more electronic device signals from an electronic device that is connected to second connector 1010 of power cord 1000. As also discussed above, interface 1234 of power cord 1200 receives one or more electronic device signals from an electronic device that is connected to second connector 1210 of power cord 1200.

At step 1504, based at least on the electronic device signal(s), the power cord determines a state of the electronic device. For example, as discussed above, based at least on the electronic device signal(s), device monitoring logic 1036 within power cord 1000 determines a state of the electronic device. As also discussed above, based at least on the electronic device signals, device monitoring logic 1236 within power cord 1200 determines a state of the electronic device.

At step 1506, based at least on the state of the electronic device, the power cord controls a switching element of the power cord to connect a first conductive element of the power cord to a second conductive element of the power cord, thereby enabling the flow of electric current from a first connector of the power cord to a second connector of the power cord. For example, as discussed above, control logic 1032 of power cord 1000, based at least on the state of the electronic device, controls switching element 1030 to connect first conductive element 1022 to second conductive element 1024, thereby enabling the flow of electric current from first connector 1002 to second connector 1010. As also discussed above, control logic 1232 of power cord 1200, based at least on the state of the electronic device, controls switching element 1230 to connect first conductive element 1222 to second conductive element 1224, thereby enabling the flow of electric current from first connector 1202 to second connector 1210.

FIG. 16 depicts a flowchart 1600 of a method for increasing or attenuating an amount of electric current that is permitted to flow through a power cord with in-line power control functionality based at least on a state of an electronic device to which the power cord is connected. The method of flowchart 1600 will be described with continued reference to power cord 1000 of FIG. 10 and power cord 1200 of FIG. 12. However, the method is not limited to those embodiments.

As shown in FIG. 16, the method of flowchart 1600 begins at step 1602 in which the power cord receives one or more electronic device signals. For example, as discussed above, interface 1034 of power cord 1000 receives one or more electronic device signals from an electronic device that is connected to second connector 1010 of power cord 1000. As also discussed above, interface 1234 of power cord 1200 receives one or more electronic device signals from an electronic device that is connected to second connector 1210 of power cord 1200.

At step 1604, based at least on the electronic device signal(s), the power cord determines a state of the electronic device. For example, as discussed above, based at least on the electronic device signal(s), device monitoring logic 1036 within power cord 1000 determines a state of the electronic device. As also discussed above, based at least on the electronic device signals, device monitoring logic 1236 within power cord 1200 determines a state of the electronic device.

At step 1606, based at least on the state of the electronic device, the power cord increases or attenuates an amount of electric current that is passed from a first conductive element of the power cord to a second conductive element of the power cord, thereby controlling an amount of electric current that flows from a first connector of the power cord to a second connector of the power cord. For example, as discussed above, control logic 1032 of power cord 1000, based at least on the state of the electronic device, controls power control functionality of power cord 1000 to increase or attenuate an amount of current that is passed from first conductive element 1022 to second conductive element 1024, thereby controlling an amount of electric current that flows from first connector 1002 to second connector 1010. As also discussed above, control logic 1232 of power cord 1200, based at least on the state of the electronic device, controls power control functionality of power cord 1200 to increase or attenuate an amount of current that is passed from first conductive element 1222 to second conductive element 1224, thereby controlling an amount of electric current that flows from first connector 1202 to second connector 1210.

FIG. 17 is a block diagram of an alternate power cord 1700 with in-line power control functionality in which control logic in the power cord is configured to activate and/or modify the operation of the power control functionality based at least on an analysis of sensor data.

As shown in FIG. 17, power cord 1700 includes a first connector 1702, a second connector 1710, a first conductive element 1722, a second conductive element 1724, a third conductive element 1726, and a switching element 1730. These components are analogous to first connector 202, second connector 210, first conductive element 222, second conductive element 224, third conductive element 226 and switching element 230 of power cord 200, respectively, and thus need not be described further.

Power cord 1700 also includes control logic 1732. Control logic 1732 is operable to analyze sensor data from one or more internal or external sensors, and based at least on the results of the analysis of the sensor data, to control switching element 1730 to either connect first conductive element 1722 to second conductive element 1724, thereby enabling a flow of electric current from first connector 1702 to second connector 1710, or to disconnect first conductive element 1722 from second conductive element 1724, thereby disabling the flow of electric current from first connector 1702 to second connector 1710.

In a further embodiment, power cord 1700 may further comprise additional power control functionality. Such additional power control functionality may be part of switching element 1730 or connected thereto. This additional power control functionality may be operable to vary an amount of electrical current that is passed from first conductive element 1722 to second conductive element 1724 when first conductive element 1722 is connected to second conductive element 1724.

In accordance with such an embodiment, control logic 1732 can control such additional power control functionality to selectively increase or attenuate the amount of current that is permitted to flow from first conductive element 1722 to second conductive element 1724 when those elements are connected. Control logic 1732 can perform such selective increasing or attenuation based at least on the results of the analysis of the sensor data.

The sensor data may originate from one or more internal or external sensors. For example, power cord 1700 may include one or more internal sensors 1736 each of which is capable of detecting or sensing physical stimulus (such as motion, light, heat, sound, pressure, magnetism, etc.) and generating a resulting signal (e.g., for measurement or control). Such sensor signals are passed to control logic 1732 via at least one interface 1738. Example sensors that may be included in power cord 1700 may include but are by no means limited to an accelerometer, a gyroscope, a digital compass, a Global Position System (GPS) sensor, a motion sensor, a pressure sensor, a humidity sensor, a gas sensor, a thermometer, a smoke detector, a microphone, a light sensor, and a camera.

Control logic 1732 may also receive sensor signals from one or more sensors that are external to power cord 1700. Such sensor signals may be passed to control logic 1732 via one or more interfaces 1734. In an alternate embodiment, external sensor data may also be passed to control logic 1732 via a conductive element of power cord 1700 (e.g., a hot wire, a neutral wire, or a ground wire of power cord 1700).

In certain embodiments, one or more of sensor(s) 1736, interface(s) 1734, interface(s) 1738, control logic 1732 and switching element 1730 may be powered by a portion of the power received via first connector 1702. In accordance with such embodiments, power cord 1700 may further include a power converter that converts a portion of the power received via first connector 1702 to a voltage level that is suitable for use by the relevant component(s).

Power cord 1700 may advantageously be utilized to stop or start conducting power to electronic equipment in the event of an emergency or hazardous event in the area in which power cord 1700 is located. For example, if control logic 1732 determines based on sensor data that there is flooding in the area of power cord 1700, control logic 1732 can cause power cord 1700 to stop conducting power to help avoid a dangerous situation and/or to help mitigate damage to the electronic equipment. As another example, if control logic 1732 determines based on sensor data that there is a security breach in the area in which power cord 1700 is located, power cord 1700 can shut down power to the equipment to which it is connected to prevent unauthorized access to secure data or other assets. As yet another example, if control logic 1732 determines based on sensor data that there is a fire in the area of power cord 1700, control logic 1732 can cause power cord 1700 to turn on power to a sprinkler system.

Power cord 1700 may also advantageously be utilized to enact a fail-safe mechanism associated with electronic equipment powered thereby. For example, if control logic 1732 determines based on sensor data that there is a situation that might result in harm to personnel, power cord 1700 may operate to automatically shut down power to the electronic equipment. Conversely, power cord 1700 may be utilized to enact a fail-on mechanism, in which electronic equipment is automatically powered on in certain scenarios.

Power cord 1700 may also be utilized to turn on or off electronic devices based on environmental conditions determined through sensor data. For example, power cord 1700 may turn on outdoor lighting in response to determining through sensor data that the sun has set and turn off outdoor lighting in response to determining through sensor data that the sun is shining. As another example, power cord 1700 may be utilized to turn on devices within a room (e.g., lights) in response to detecting through sensor data that a person has entered the room and to turn off devices within the room in response to detecting through sensor data that there is nobody currently in the room.

The foregoing are but a few example applications of power cord 1700. Numerous other applications of this technology are possible.

FIGS. 18-20 are flowcharts that further illustrate a manner of operation of a power cord with in-line power control functionality in accordance with various embodiments. In particular, FIG. 18 depicts a flowchart 1800 of a method for disabling a flow of electric current through a power cord with in-line power control functionality based at least on an analysis of sensor data. The method of flowchart 1800 will be described with continued reference to power cord 1700 of FIG. 17. However, the method is not limited to that embodiment.

As shown in FIG. 18, the method of flowchart 1800 begins at step 1802 in which the power cord receives sensor data from one or more sensors. For example, as discussed above, one or more of interface(s) 1734 and interface(s) 1738 of power cord 1700 receives sensor data from one or more internal and/or external sensors.

At step 1804, the power cord analyzes the sensor data. For example, as discussed above, control logic 1732 of power cord 1700 analyzes the sensor data.

At step 1806, based at least on the analysis of the sensor data, the power cord controls a switching element of the power cord to disconnect a first conductive element of the power cord from a second conductive element of the power cord, thereby disabling the flow of electric current from a first connector of the power cord to a second connector of the power cord. For example, as discussed above, control logic 1732 of power cord 1700, based at least on the analysis of the sensor data, controls switching element 1730 to disconnect first conductive element 1722 from second conductive element 1724, thereby disabling the flow of electric current from first connector 1702 to second connector 1710.

FIG. 19 depicts a flowchart 1900 of a method for enabling a flow of electric current through a power cord with in-line power control functionality based at least on an analysis of sensor data. The method of flowchart 1800 will be described with continued reference to power cord 1700 of FIG. 17. However, the method is not limited to that embodiment.

As shown in FIG. 19, the method of flowchart 1900 begins at step 1902 in which the power cord receives sensor data from one or more sensors. For example, as discussed above, one or more of interface(s) 1734 and interface(s) 1738 of power cord 1700 receives sensor data from one or more internal and/or external sensors.

At step 1904, the power cord analyzes the sensor data. For example, as discussed above, control logic 1732 of power cord 1700 analyzes the sensor data.

At step 1906, based at least on the analysis of the sensor data, the power cord controls a switching element of the power cord to connect a first conductive element of the power cord to a second conductive element of the power cord, thereby enabling the flow of electric current from a first connector of the power cord to a second connector of the power cord. For example, as discussed above, control logic 1732 of power cord 1700, based at least on the analysis of the sensor data, controls switching element 1730 to connect first conductive element 1722 to second conductive element 1724, thereby enabling the flow of electric current from first connector 1702 to second connector 1710.

FIG. 20 depicts a flowchart 2000 of a method for increasing or attenuating an amount of electric current that is permitted to flow through a power cord with in-line power control functionality based at least on an analysis of sensor data. The method of flowchart 2000 will be described with continued reference to power cord 1700 of FIG. 17. However, the method is not limited to that embodiment.

As shown in FIG. 20, the method of flowchart 2000 begins at step 2002 in which the power cord receives sensor data from one or more sensors. For example, as discussed above, one or more of interface(s) 1734 and interface(s) 1738 of power cord 1700 receives sensor data from one or more internal and/or external sensors.

At step 2004, the power cord analyzes the sensor data. For example, as discussed above, control logic 1732 of power cord 1700 analyzes the sensor data.

At step 2006, based at least on the analysis of the sensor data, the power cord increases or attenuates an amount of electric current that is passed from a first conductive element of the power cord to a second conductive element of the power cord, thereby controlling an amount of electric current that flows from a first connector of the power cord to a second connector of the power cord. For example, as discussed above, control logic 1732 of power cord 1700, based at least on the analysis of the sensor data, controls power control functionality of power cord 1700 to increase or attenuate an amount of current that is passed from first conductive element 1722 to second conductive element 1724, thereby controlling an amount of electric current that flows from first connector 1702 to second connector 1710.

FIG. 21 is a block diagram of a system 2100 for programmatically activating or modifying the in-line power control functionality of a power cord. As shown in FIG. 21, system 2100 includes a power cord 2102 with in-line power control functionality that includes control logic 2104. Power cord 2102 may represent any of power cord 200, power cord 700, power cord 1000, power cord 1200, power cord 1700 as described above with reference to FIGS. 2, 7, 10, 12 and 17, respectively. Thus, control logic 2106 may represent any of control logic 232, control logic 732, control logic 1032, control logic 1232 and control logic 1732 as described above in reference to FIGS. 2, 7, 10, 12 and 17.

As further shown in FIG. 21, control logic 2104 includes an application programming interface (API) 2106. API 2016 enables an electronic device 2108 that is connected to power cord 2102 via a wired (including powerline) or wireless connection to programmatically invoke or modify one or more power control functions of power cord 2102.

For example, a program running on electronic device 2108 may be configured to present a user interface (e.g., a GUI or CLI) to a user of electronic device 2108. The program may interact with control logic 2014 of power cord 2102 via API 2106 to obtain status information about power cord 2102 (e.g., whether power cord 2102 is conducting power or not, how much current power cord 2102 is conducting) and the user interface may present such information to the user. The program may also interact with control logic 2104 via API 2106 to determine whether certain power control functions are active or inactive, or to determine under what conditions certain power control functions will be activated or deactivated. The program may present such information to the user and also provide the user with an option to modify such information. Thus, the user may interact with the user interface to activate or deactivate certain power control functionality of power cord 2102 (e.g., the user may interact with the user interface to toggle the power conducting functionality of power cord 2102 on or off, or to control an amount of current conducted by power cord 2102). Also, the user may interact with the user interface to define the conditions upon which certain power control functionality of power cord 2102 will be activated or deactivated (e.g., the user may interact with the user interface to cause power cord 2102 to conduct power during daylight hours only, the user may interact with the user interface to define conditions under which a powered device is determined to be malfunctioning, such that power cord 2102 will trigger a reset of that device, etc.).

API 2106 may also be utilized by a program running on electronic device 2108 to automatically invoke power control functionality of power cord 2102. For example, an application running on electronic device 2108 may be configured to communicate with control logic 2104 via API 2106 to cause power cord 2102 to start conducting power, stop conducting power, or selectively conduct a certain amount of power based on conditions determined by the application. For example, the application may be a security program that determines that a security breach has occurred in a facility. In response to the security breach, the application may interact with control logic 2104 via API 2106 to cause power cord 2102 to shut down power to one or more devices.

III. Additional Exemplary Embodiments

In the foregoing section, a power cord is described that manages the manner in which power is provided from a power source to a power consumer. In some embodiments, the power cord manages the manner in which power is provided from an AC power source to an AC power consumer. For example, a power cord in accordance with an embodiment may be used to manage the manner in which power is provided from an 110V AC power source to an 110V AC power consumer, although this is merely one example. However, in other embodiments, the power cord manages the manner in which power is provided from a DC power source to a DC power consumer. For example, a power cord in accordance with an embodiment may be used to manage the manner in which power is provided from a 48V DC power source to a 48V DC power consumer, although this is merely one example.

Furthermore, in certain embodiments described above, a switching element is used to selectively connect and disconnect components of a "hot wire" in a power cord that also comprises a "neutral wire," thereby selectively enabling and disabling the flow of electric current through the power cord. In a variation of this embodiment, the switching element may instead be used to selectively connect and disconnect components of the "neutral wire." This will also have the effect of selectively enabling and disabling the flow of electric current through the power cord. In a still further variation of this embodiment, the switching element may be used to simultaneously connect and disconnect components of both the "hot wire" and the "neutral wire," thereby selectively enabling the flow of electric current through the power cord.

The techniques described herein may also be applied to other types of power cords. For example, the techniques described herein may be applied to multi-phase power cords that include multiple "hot wires," wherein each hot wire operates to provide power at a distinct phase. FIG. 22 shows an example of such a power cord. In particular, FIG. 22 shows a power cord 2200 that includes a first connector 2202, a second connector 2210, a first conductive element 2222, a second conductive element 2224, a third conductive element 2226, a fourth conductive element 2228, a fifth conductive element 2229, a switching element 2230, and control logic 2232. Each of these components will now be described.

First connector 2202 is located at a first end of power cord 2200 and may comprise any one of a wide variety of power cord connector types that are suitable for connecting to a power source and for receiving an electric current therefrom. Second connector 2210 is located at a second end of power cord 2200 and may comprise any one of a wide variety of power cord connector types that are suitable for connecting to a power consumer and for transmitting an electric current thereto.

First conductive element 2222 and second conductive element 2224 collectively comprise a first "hot wire" that is operable to provide power at a first phase. Third conductive element 2226 and fourth conductive element 2228 collectively comprise a second "hot wire" that is operable to provide power at a second phase that is 180 degrees offset from the first phase. Conductive element 2229 comprises a "neutral wire." This configuration may represent, for example, a split phase 240V AC power distribution configuration.

In power cord 2200, switching element 2230 is operable to selectively and simultaneously connect and disconnect first conductive element 2222 and second conductive element 2224 that comprise the first hot wire and third conductive element 2226 and fourth conductive element 2228 that comprise the second hot wire, thereby enabling or disabling the flow of electric current from first connector 2202 to second connector 2210. Switching element 2230 may perform these operations under the control of control logic 2232. Control logic 2232 may control switching element 2230, for example and without limitation, based on control signals received from an external device (e.g., in a like manner to control logic 232 or control logic 732, as described above in reference to FIGS. 2 and 7, respectively), based on the state of a monitored device (e.g., in a like manner to control 1032 or control logic 1232, as described above in reference to FIGS. 10 and 12, respectively), or based on an analysis of sensor data (e.g., in a like manner to control logic 1732 as described above in reference to FIG. 7).

FIG. 23 provides another example of a multi-phase power cord in accordance with an embodiment. In particular, FIG. 23 shows a power cord 2300 that includes a first connector 2302, a second connector 2310, a first conductive element 2322, a second conductive element 2323, a third conductive element 2324, a fourth conductive element 2325, a fifth conductive element 2326, a sixth conductive element 2327, a seventh conductive element 2328, a switching element 2230, and control logic 2232. Each of these components will now be described.

First connector 2302 is located at a first end of power cord 2300 and may comprise any one of a wide variety of power cord connector types that are suitable for connecting to a power source and for receiving an electric current therefrom. Second connector 2310 is located at a second end of power cord 2300 and may comprise any one of a wide variety of power cord connector types that are suitable for connecting to a power consumer and for transmitting an electric current thereto.

First conductive element 2322 and second conductive element 2323 collectively comprise a first "hot wire" that is operable to provide power at a first phase. Third conductive element 2324 and fourth conductive element 2325 collectively comprise a second "hot wire" that is operable to provide power at a second phase that is 120 degrees offset from the first phase. Fifth conductive element 2326 and sixth conductive element 2327 collectively comprise a third "hot wire" that is operable to provide power at a third phase that is 120 degrees offset from the first phase and 120 degrees offset from the second phase. Conductive element 2328 comprises a "neutral wire." This configuration may represent, for example, a three phase Wye power distribution configuration.

In power cord 2300, switching element 2330 is operable to selectively and simultaneously connect and disconnect first conductive element 2322 and second conductive element 2323 that comprise the first hot wire, third conductive element 2324 and fourth conductive element 2325 that comprise the second hot wire, and fifth conductive element 2326 and sixth conductive element 2327 that comprise the third hot wire, thereby enabling or disabling the flow of electric current from first connector 2302 to second connector 2310. Switching element 2330 may perform these operations under the control of control logic 2332. Control logic 2332 may control switching element 2330, for example and without limitation, based on control signals received from an external device (e.g., in a like manner to control logic 232 or control logic 732, as described above in reference to FIGS. 2 and 7, respectively), based on the state of a monitored device (e.g., in a like manner to control 1032 or control logic 1232, as described above in reference to FIGS. 10 and 12, respectively), or based on an analysis of sensor data (e.g., in a like manner to control logic 1732 as described above in reference to FIG. 7).

The foregoing are only a few examples of different types of power cords that may implement the techniques described above. As will be appreciated by persons skilled in the relevant art(s), the foregoing techniques may be advantageously applied in any type of power cord suitable for working with worldwide utility voltages in addition to DC powered equipment.

A power cord is described herein. The power cord includes a first connector, a second connector, a first conductive element, a second conductive element, a third conductive element, a switching element, control logic and an interface. The first connector is at a first end of the power cord and is configured to connect to a power source. The second connector is at a second end of the power cord and is configured to connect to a power consumer. The first conductive element is connected to the first connector. The second conductive element is connected to the second connector. The third conductive element is connected to the first connector and the second connector. The switching element is operable to connect the first conductive element to the second conductive element, thereby enabling a flow of electric current from the first connector to the second connector, and to disconnect the first conductive element from the second conductive element, thereby disabling the flow of electric current from the first connector to the second connector. The control logic is configured to receive control signals and, responsive to at least the control signals, control the switching element to either connect the first conductive element to the second conductive element or to disconnect the first conductive element from the second conductive element. The interface is configured to receive the control signals via one of the first conductive element, the second conductive element, or the third conductive element.

In one embodiment of the foregoing power cord, the first conductive element and the second conductive element collectively comprise a hot wire of the power cord and the third conductive element comprises one of a neutral wire or a ground wire of the power cord. In an alternate embodiment of the foregoing power cord, the first conductive element and the second conductive element collectively comprise a neutral wire of the power cord and the third conductive element comprises one of a hot wire or a ground wire of the power cord.

In another embodiment of the foregoing power cord, the switching element comprises a relay. In further accordance with such an embodiment, the relay may comprise one of an electromechanical relay or a solid state relay.

In still another embodiment of the foregoing power cord, the switching element is operable to simultaneously connect and simultaneously disconnect a plurality of hot wires, each of the plurality of hot wires operating at a distinct phase.

In yet another embodiment of the foregoing power cord, the control logic is further configured to selectively increase or attenuate an amount of electric current that is passed from the first conductive element to the second conductive element when the first conductive element is connected to the second conductive element by the switching element.

Another power cord is described herein. The power cord includes a first connector, a second connector, a first conductive element, a second conductive element, a switching element, and control logic. The first connector is at a first end of the power cord and is configured to connect to a power source. The second connector is at a second end of the power cord and is configured to connect to an electronic device. The first conductive element is connected to the first connector. The second conductive element is connected to the second connector. The switching element is operable to connect the first conductive element to the second conductive element, thereby enabling a flow of electrical current from the first connector to the second connector, and to disconnect the first conductive element from the second conductive element, thereby disabling the flow of electrical current from the first connector to the second connector. The control logic is configured to determine a state of the electronic device and, based at least on the state of the electronic device, control the switching element to either connect the first conductive element to the second conductive element or to disconnect the first conductive element from the second conductive element.

In one embodiment of the foregoing power cord, the switching element comprises a relay. In further accordance with such an embodiment, the relay comprises one of an electromechanical relay or a semiconductor relay.

In a further embodiment of the foregoing power cord, the switching element is operable to simultaneously connect and simultaneously disconnect a plurality of hot wires, each of the plurality of hot wires operating at a distinct phase.

In another embodiment of the foregoing power cord, the control logic is further configured to selectively increase or attenuate an amount of electric current that is passed from the first conductive element to the second conductive element when the first conductive element is connected to the second conductive element by the switching element.

In yet another embodiment of the foregoing power cord, the power cord further comprises an interface configured to receive signals from the electronic device and the control logic is configured to determine the state of the electronic device based at least on the signals. In further accordance with such an embodiment, the interface may be configured to receive the signals from the electronic device via at least one of a wired communication medium and a wireless communication medium. Alternatively, the interface may be configured to receive the signals from the electronic device via one or more conductive elements of the power cord.

In still another embodiment of the foregoing power cord, the control logic is configured to determine that the electronic device is in an impaired state based at least on a cessation of signals from the electronic device and to disconnect the first conductive element from the second conductive element responsive to at least determining that the device is in the impaired state.

Yet another power cord is described herein. The power cord includes a first connector, a second connector, a first conductive element, a second conductive element, a switching element, control logic and an interface. The first connector is at a first end of the power cord and is configured to connect to a power source. The second connector is at a second end of the power cord and is configured to connect to a power consumer. The first conductive element is connected to the first connector. The second conductive element is connected to the second connector. The switching element is operable to connect the first conductive element to the second conductive element, thereby enabling a flow of electrical current from the first connector to the second connector, and to disconnect the first conductive element from the second conductive element, thereby disabling the flow of electrical current from the first connector to the second connector. The control logic is configured to analyze sensor data, and based on at least the analysis of the sensor data, to control the switching element to either connect the first conductive element to the second conductive element or to disconnect the first conductive element from the second conductive element. The interface is operable to receive the sensor data from one or more sensors.

In one embodiment of the foregoing power cord, the control logic is further configured to selectively increase or attenuate an amount of electric current that is passed from the first conductive element to the second conductive element when the first conductive element is connected to the second conductive element by the switching element.

In another embodiment of the foregoing power cord, the interface is configured to receive the sensor data from one or more external sensors via at least one of a wired communication medium and a wireless communication medium.

In yet another embodiment of the foregoing power cord, the interface is configured to receive the sensor data from one or more external sensors via one or more conductive elements of the power cord.

In still another embodiment of the foregoing power cord, the power cord includes the one or more sensors.

In a further embodiment of the foregoing power cord, the one or more sensors include one or more of: an accelerometer; a gyroscope; a digital compass; a GPS sensor; a motion sensor; a pressure sensor; a humidity sensor; a gas sensor; a thermometer; a smoke detector; a microphone; a light sensor; and a camera.

In a still further embodiment of the foregoing power cord, the control logic includes an application programming interface that enables programmatic invoking or modification of the control logic by a device external to the power cord.

IV. Conclusion

While various embodiments have been described above, it should be understood that they have been presented by way of example only, and not limitation. It will be apparent to persons skilled in the relevant art(s) that various changes in form and details can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. A system, comprising:
    a plurality of network switches;
    a computing device that is connected to the plurality of network switches and is configured to monitor an operational state thereof; and
    a corresponding power cord connected between each one of the network switches and a corresponding power source, each power cord comprising:
        a first connector at a first end of the power cord, the first connector being configured to connect to the corresponding power source;
        a second connector at a second end of the power cord, the second connector being configured to connect to the corresponding network switch;
        a first conductive element that is connected to the first connector;
        a second conductive element that is connected to the second connector;
        a third conductive element that is connected to the first connector and the second connector;
        a switching element that is operable to connect the first conductive element to the second conductive element, thereby enabling a flow of electric current from the first connector to the second connector, and to disconnect the first conductive element from the second conductive element, thereby disabling the flow of electric current from the first connector to the second connector; and
        control logic that is configured to receive control signals from the computing device and, responsive to at least the control signals, control the switching element to either connect the first conductive element to the second conductive element or to disconnect the first conductive element from the second conductive element.

2. The system of claim 1, wherein the first conductive element and the second conductive element collectively comprise a hot wire of the power cord and wherein the third conductive element comprises one of a neutral wire or a ground wire of the power cord.

3. The system of claim 1, wherein the switching element comprises a relay.

4. The system of claim 1, wherein the switching element is operable to simultaneously connect and simultaneously disconnect a plurality of hot wires, each of the plurality of hot wires operating at a distinct phase.

5. The system of claim 1, wherein the control logic is further configured to selectively increase or attenuate an amount of electric current that is passed from the first conductive element to the second conductive element when the first conductive element is connected to the second conductive element by the switching element.

6. A system, comprising:
    a plurality of network switches; and
    a corresponding power cord connected between each one of the network switches and a corresponding power source, each power cord comprising:
        a first connector at a first end of the power cord, the first connector being configured to connect to the corresponding power source;
        a second connector at a second end of the power cord, the second connector being configured to connect to the corresponding network switch;
        a first conductive element that is connected to the first connector;
        a second conductive element that is connected to the second connector;
        a switching element that is operable to connect the first conductive element to the second conductive element, thereby enabling a flow of electrical current from the first connector to the second connector, and to disconnect the first conductive element from the second conductive element, thereby disabling the flow of electrical current from the first connector to the second connector; and
        control logic that is configured to determine a state of the corresponding network switch to which the power cord is connected and, based at least on the state of the corresponding network switch to which the power cord is connected, control the switching element to either connect the first conductive element to the second conductive element or to disconnect the first conductive element from the second conductive element.

7. The system of claim 6, wherein the switching element comprises a relay.

8. The system of claim 6, wherein the switching element is operable to simultaneously connect and simultaneously disconnect a plurality of hot wires, each of the plurality of hot wires operating at a distinct phase.

9. The system of claim 6, wherein the control logic is further configured to selectively increase or attenuate an amount of electric current that is passed from the first conductive element to the second conductive element when the first conductive element is connected to the second conductive element by the switching element.

10. The system of claim 6, wherein the power cord further comprises:
an interface configured to receive signals from the corresponding network switch;
wherein the control logic is configured to determine the state of the corresponding network switch based at least on the signals.

11. The system of claim 10, wherein the interface is configured to receive the signals from the corresponding network switch via at least one of a wired communication medium and a wireless communication medium.

12. The system of claim 10, wherein the interface is configured to receive the signals from the corresponding network switch via one or more conductive elements of the power cord.

13. The system of claim 10, wherein the control logic is configured to determine that the corresponding network switch is in an impaired state based at least on a cessation of signals from the corresponding network switch and to disconnect the first conductive element from the second conductive element responsive to at least determining that the corresponding network switch is in the impaired state.

14. A power cord, comprising:
a first connector at a first end of the power cord, the first connector being configured to connect to a multi-phase power source;
a second connector at a second end of the power cord, the second connector being configured to connect to a power consumer;
a first conductive element that is connected to the first connector;
a second conductive element that is connected to the second connector;
a third conductive element that is connected to the first connector;
a fourth conductive element that is connected to the second connector;
a switching element that is operable to connect the first conductive element to the second conductive element, thereby enabling a flow of electrical current from the first connector to the second connector to provide power at a first phase, to disconnect the first conductive element from the second conductive element, thereby disabling the flow of electrical current from the first connector to the second connector, to connect the third conductive element to the fourth conductive element, thereby enabling a flow of electrical current from the first connector to the second connector to provide power at a second phase that is different from the first phase, and to disconnect the third conductive element from the fourth conductive element, thereby disabling the flow of electrical current from the first connector to the second connector; and
control logic that is configured to receive control signals, and based on at least the control signals, to control the switching element to connect the first conductive element to the second conductive element, disconnect the first conductive element from the second conductive element, connect the third conductive element to the fourth conductive element, or disconnect the third conductive element from the fourth conductive element.

15. The power cord of claim 14, wherein the control logic is further configured to selectively increase or attenuate an amount of electric current that is passed from the first conductive element to the second conductive element when the first conductive element is connected to the second conductive element by the switching element.

16. The power cord of claim 14, comprising an interface configured to receive sensor data from one or more external sensors via at least one of a wired communication medium and a wireless communication medium.

17. The power cord of claim 16, wherein the interface is configured to receive the sensor data from one or more external sensors via one or more conductive elements of the power cord.

18. The power cord of claim 16, further comprising:
the one or more sensors.

19. The power cord of claim 16, wherein the one or more sensors include one or more of:
an accelerometer;
a gyroscope;
a digital compass;
a Global Position System (GPS) sensor;
a motion sensor;
a pressure sensor;
a humidity sensor;
a gas sensor;
a thermometer;
a smoke detector;
a microphone;
a light sensor; and
a camera.

20. The power cord of claim 14, wherein the control logic includes an application programming interface that enables programmatic invoking or modification of the control logic by a device external to the power cord.

* * * * *